(12) United States Patent
Shiba et al.

(10) Patent No.: US 7,386,603 B2
(45) Date of Patent: Jun. 10, 2008

(54) CONTENTS DISTRIBUTING SERVER, CONTENTS DISTRIBUTION CONTROL METHOD, PROGRAM, AND RECORDING MEDIUM

(75) Inventors: Rikio Shiba, Kanagawa (JP); Katsuhiko Tanaka, Tokyo (JP); Takayuki Nagatsuka, Kanagawa (JP); Yukihiko Shimizu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 10/177,210

(22) Filed: Jun. 24, 2002

(65) Prior Publication Data

US 2003/0018775 A1 Jan. 23, 2003

(30) Foreign Application Priority Data

Jun. 25, 2001 (JP) ............................. 2001-190868
Jun. 28, 2001 (JP) ............................. 2001-196776

(51) Int. Cl.
*G06F 15/16* (2006.01)
(52) U.S. Cl. ..................................... 709/219; 709/202
(58) Field of Classification Search ............... 358/1.14; 709/219, 202
See application file for complete search history.

(56) References Cited

U.S. PATENT DOCUMENTS

| 5,448,381 | A | * | 9/1995 | Bohan et al. ............... 358/527 |
| 5,894,553 | A | | 4/1999 | Kawazome et al. ... 395/200.33 |
| 6,108,099 | A | * | 8/2000 | Ohtani ....................... 358/1.15 |
| 6,324,521 | B1 | * | 11/2001 | Shiota et al. ................. 705/27 |
| 6,449,639 | B1 | * | 9/2002 | Blumberg ................... 709/217 |
| 6,460,036 | B1 | * | 10/2002 | Herz ............................ 707/10 |
| 6,594,386 | B1 | * | 7/2003 | Golshani et al. ............ 382/166 |
| 6,714,242 | B1 | * | 3/2004 | Kobayashi ................. 348/272 |
| 6,847,377 | B2 | * | 1/2005 | Kitahara et al. ............ 345/600 |
| 2001/0035814 | A1 | * | 11/2001 | Uchida ....................... 340/5.74 |
| 2002/0054224 | A1 | * | 5/2002 | Wasula et al. .............. 348/232 |
| 2003/0010818 | A1 | * | 1/2003 | Asawaka .................... 235/379 |
| 2003/0061294 | A1 | * | 3/2003 | Stennicke ................... 709/208 |

FOREIGN PATENT DOCUMENTS

| JP | 7-329404 | 12/1995 |
| JP | 8-146388 | 6/1996 |
| JP | 8-339274 | 12/1996 |
| JP | 9-50441 | 2/1997 |
| JP | 9-62688 | 3/1997 |
| JP | 9-64976 | 3/1997 |
| JP | 2000-132121 | 5/2000 |

* cited by examiner

*Primary Examiner*—Jason Cardone
*Assistant Examiner*—Chirag R Patel
(74) *Attorney, Agent, or Firm*—Fitzpatrick, Cella, Harper & Scinto

(57) ABSTRACT

Contents are distributed on the basis of information of a hobby and an address of the user and the like. The distribution of the contents is controlled also on the basis of a result of comparison of a reception intensity regarding contents of 3 or more levels set on the user side and a distribution intensity set as attributes into the contents on a distributing side.

19 Claims, 36 Drawing Sheets

FIG. 5

TPNC REGISTRATION FORM

NAME (FAMILY NAME) : KANJI
NAME (FIRST NAME) : KANJI

KANA (FAMILY NAME) : KATAKANA
KANA (FIRST NAME) : KATAKANA

ZIP CODE (HALF SIZE NUMERALS)
ADDRESS (KANJI)

PHONE NO. (HALF SIZE NUMERALS)

E-MAIL ADDRESS WHICH
IS USED AT PRESENT

OK            CANCEL

FIG. 6

TPNC REGISTRATION CHECKING FORM

| | |
|---:|:---|
| NAME : KANJI | YAMADA TAROU |
| NAME : KANA | YAMADA TAROU |

| | | | |
|---:|:---:|:---:|:---:|
| ZIP CODE (HALF SIZE NUMERALS) | ×× × | — | △△△△ |
| ADDRESS (KANJI) | TOKYO-TO △△△ KU | | |
| | ○○○ ×-××-× | | |
| PHONE NO. (HALF SIZE NUMERALS) | 03 | 3758 | ×××× |

| | |
|---:|:---|
| E-MAIL ADDRESS WHICH IS USED AT PRESENT | mail_yamda@ △△△ .co.jp |
| ENTER PASSWORD | |
| CHECK AND ENTER PASSWORD | |

[ OK ]    [ CANCEL ]

FIG. 7

TPNC SETTING FORM 1

SETTING OF THE NUMBER OF DISTRIBUTION PAPER: A4 ▼ | 10 ▼ | 50% COLOR ▼

CONNECTING FORM: DIAL-UP ▼ | PRINTER NAME ▼

SETTING OF DISTRIBUTION ARTICLES: TO PICTURE PLANE FOR SETTING DISTRIBUTION ARTICLES

PAYMENT METHOD: TO SECURED SERVER OF PICTURE PLANE FOR SETTING PAYMENT METHOD

OK | CANCEL

FIG. 8

TPNC SETTING FORM 2

| | |
|---|---|
| DESIGNATED NEWSPAPER COMPANY | A NEWSPAPER COMPANY ▼ |
| BASE POINT | HOME ▼ |
| APPLYING AREA | World Wide ▼ |
| GENRE | POLITICS ▼ |
| RECEPTION INTENSITY | HIGH ● MIDDLE ○ LOW ○ |
| DESIGNATED NEWSPAPER COMPANY | F NEWSPAPER COMPANY ▼ |
| BASE POINT | FUKUOKA-KEN △△ SHI ×× KU ▼ |
| APPLYING AREA | WITHIN KEN ▼ |
| GENRE | BASEBALL ▼ |
| RECEPTION INTENSITY | HIGH ○ MIDDLE ● LOW ○ |

[ CONTINUE SETTING OF DISTRIBUTION ARTICLES ]

[ RETURN ]   [ CANCEL ]

FIG. 9

TPNC SETTING FORM 3

| | |
|---|---|
| PAYMENT METHOD | CREDIT CARD ▼ |
| VALID TERM OF CREDIT CARD | 2010 ▼ YEAR 10 ▼ MONTH |
| ADVERTISEMENT OPTION | YES ○  NO ○ |
| DISTRIBUTION START DATE | 2000 ▼ YEAR 09 ▼ MONTH 01 ▼ DAY |
| DISTRIBUTION FORM | SET OF MORNING AND EVENING PAPER ▼ |

AMOUNT OF MONTHLY PAYMENT

| | |
|---|---|
| NO ADVERTISEMENT OPTION | ¥4,300 |
| WITH ADVERTISEMENT OPTION | ¥2.100 |

TO PICTURE PLANE FOR SETTING DISTRIBUTION ADVERTISEMENT

OK    CANCEL

FIG. 10

TPNC SETTING FORM 4

| BASE POINT | TOKYO-TO △△△ KU ○○○ ▼ |
| ---: | :--- |
| APPLYING AREA | SMALL AREA ▼ |
| GENRE | ALL ▼ |
| SETTING OF DISTRIBUTION | ALL ▼ |
| RECEPTION INTENSITY | HIGH ● MIDDLE ○ LOW ○ |

| BASE POINT | TOKYO-TO ×× KU △△△ ▼ |
| ---: | :--- |
| APPLYING AREA | MIDDLE AREA ▼ |
| GENRE | MEAL · DRINK ▼ |
| SETTING OF DISTRIBUTION | WEEKDAY MORNING PAPER ▼ |
| RECEPTION INTENSITY | HIGH ○ MIDDLE ● LOW ○ |

[ CONTINUE SETTING OF DISTRIBUTION ARTICLES ]

[ RETURN ]   [ CANCEL ]

FIG. 11

| FIG. 11A |
|----------|
| FIG. 11B |

FIG. 11A

| ITEM | REPRESENTATION DATA | DATA CODE (STORAGE DATA IN DB) | REMARKS |
|---|---|---|---|
| USER ID | △△△△ | △△△△ | ID SET BY THE USER |
| PASSWORD | ABC-newsuser1 | 5$24XB9$ZE1 | PASSWORD SET BY THE USER |
| USER NAME (KANJI) | YAMADA TAROU | YAMADA TAROU | |
| USER NAME (ALPHABET) | yamada tarou | yamada_tarou | |
| ADDRESS | TOKYO-TO △△△ KU ooo X-XX-X | 1460092 | ZIP CODE |
| PHONE NO. | 03-3758-XXXX | 33758XXXX | |
| E-MAIL ADDRESS | mail_yamada@△△△.co.jp | mail_yamada@△△△.co.jp | |
| USER ATTRIBUTE 1 | 20-29 YEARS OLD | 20 | USER AGE GROUP |
| USER ATTRIBUTE 2 | MALE | 0 | USER SEX |
| DELIVERY START DATE | 2000.07.10 | 20000710 | |
| DELIVERY PERIOD (PROGRAMMED DELIVERY END DATE) | 2002.07.10 | 20020710 | |
| PAYMENT METHOD | CreditCard1 | 1 | |
| SETTING OF SUBSCRIPTION | | | |
| THE SET NUMBER OF DISTRIBUTION PAPER | 6 | 6 | |
| DISTRIBUTION SIZE | A4(0) | 0 | |
| THE NUMBER OF DISTRIBUTION PAPER | 5 | 5 | |
| COLOR OPTION | 20% LESS THAN (20) | 20 | |
| CONNECTING FORM | Analog56kbps | 4 | |
| HOST | PC600A | 1 | |
| PRINTER | InkjetColorA | 23682391 | |

FROM FIG. 11A

| | |
|---|---|
| DISTRIBUTION INFORMATION 1 · BASE POINT | TOKYO-TO △△△ KU ○○○ |
| DISTRIBUTION INFORMATION 1 · APPLYING AREA | WorldWide (0) |
| DISTRIBUTION INFORMATION 1 · DESIGNATED NEWSPAPER COMPANY | A NEWSPAPER COMPANY |
| DISTRIBUTION INFORMATION 1 · GENRE | POLITICS (1) |
| DISTRIBUTION INFORMATION 1 · RECEPTION INTENSITY | HIGH (3) |
| DISTRIBUTION INFORMATION 2 · BASE POINT | TOKYO-TO △△△ KU ○○○ |
| DISTRIBUTION INFORMATION 2 · APPLYING AREA | WorldWide (0) |
| DISTRIBUTION INFORMATION 2 · DESIGNATED NEWSPAPER COMPANY | B NEWSPAPER COMPANY |
| DISTRIBUTION INFORMATION 2 · GENRE | ECONOMICS (2) |
| DISTRIBUTION INFORMATION 2 · RECEPTION INTENSITY | HIGH (3) |
| DISTRIBUTION INFORMATION 3 · BASE POINT | TOKYO-TO △△△ KU ○○○ |
| DISTRIBUTION INFORMATION 3 · APPLYING AREA | JAPAN (2) |
| DISTRIBUTION INFORMATION 3 · DESIGNATED NEWSPAPER COMPANY | C NEWSPAPER COMPANY |
| DISTRIBUTION INFORMATION 3 · GENRE | SOCIETY (3) |
| DISTRIBUTION INFORMATION 3 · RECEPTION INTENSITY | MIDDLE (2) |
| DISTRIBUTION INFORMATION 4 · BASE POINT | TOKYO-TO XX KU △△△ |
| DISTRIBUTION INFORMATION 4 · APPLYING AREA | TOKYO 23 KU (4) |
| DISTRIBUTION INFORMATION 4 · DESIGNATED NEWSPAPER COMPANY | D NEWSPAPER COMPANY |
| DISTRIBUTION INFORMATION 4 · GENRE | LIFE (4) |
| DISTRIBUTION INFORMATION 4 · RECEPTION INTENSITY | HIGH (3) |
| DISTRIBUTION INFORMATION 5 · BASE POINT | NAGANO-KEN ○○○ KU XX |
| DISTRIBUTION INFORMATION 5 · APPLYING AREA | WITHIN KEN (3) |
| DISTRIBUTION INFORMATION 5 · DESIGNATED NEWSPAPER COMPANY | E NEWSPAPER COMPANY |
| DISTRIBUTION INFORMATION 5 · GENRE | LODGING (56) |
| DISTRIBUTION INFORMATION 5 · RECEPTION INTENSITY | LOW (1) |
| DISTRIBUTION INFORMATION 6 · BASE POINT | FUKUOKA-KEN △△ KU △△ |
| DISTRIBUTION INFORMATION 6 · APPLYING AREA | WITHIN KEN (3) |
| DISTRIBUTION INFORMATION 6 · DESIGNATED NEWSPAPER COMPANY | F NEWSPAPER COMPANY |
| DISTRIBUTION INFORMATION 6 · GENRE | BASEBALL (78) |
| DISTRIBUTION INFORMATION 6 · RECEPTION INTENSITY | MIDDLE (2) |

| |
|---|
| 1460092 |
| 0 |
| 0 |
| 1 |
| 3 |
| 1460092 |
| 0 |
| 1 |
| 2 |
| 3 |
| 1460092 |
| 2 |
| 2 |
| 3 |
| 2 |
| 1000004 |
| 4 |
| 3 |
| 4 |
| 3 |
| 3890102 |
| 3 |
| 4 |
| 56 |
| 1 |
| 8120000 |
| 3 |
| 4 |
| 78 |
| 2 |

FIG. 12

| FIG. 12A |
|---|
| FIG. 12B |

FIG. 12A

| | | | LAYOUT RATIO · LOCALITY PRIORITY, ETC. |
|---|---|---|---|
| ADVERTISEMENT OPTION | YES (1) | 1 | |
| ADVERTISEMENT LAYOUT | 30% (30) | 30 | |
| COLOR OPTION | YES (1) | 1 | |
| ADVERTISEMENT INFORMATION 1 · BASE POINT | TOKYO-TO △△△ KU ○○○ | 1460092 | |
| ADVERTISEMENT INFORMATION 1 · APPLYING AREA | SMALL AREA (0) | 1460092 | |
| ADVERTISEMENT INFORMATION 1 · GENRE | ALL (0) | 0 | |
| ADVERTISEMENT INFORMATION 1 · DISTRIBUTION DATE/TIME | ALL (0) | 0 | |
| ADVERTISEMENT INFORMATION 1 · RECEPTION INTENSITY | HIGH (3) | 3 | |
| ADVERTISEMENT INFORMATION 2 · BASE POINT | TOKYO-TO XX KU △△△ | 1000004 | |
| ADVERTISEMENT INFORMATION 2 · APPLYING AREA | MIDDLE AREA (1) | 100000* | |
| ADVERTISEMENT INFORMATION 2 · GENRE | MEAL · DRINK (42) | 42 | |
| ADVERTISEMENT INFORMATION 2 · DISTRIBUTION DATE/TIME | WEEKDAY MORNING PAPER (1) | 1 | |
| ADVERTISEMENT INFORMATION 2 · RECEPTION INTENSITY | MIDDLE (3) | 3 | |
| ADVERTISEMENT INFORMATION 3 · BASE POINT | NAGANO-KEN △△ KU △△ | 3890102 | |
| ADVERTISEMENT INFORMATION 3 · APPLYING AREA | LARGE AREA (2) | 389***** | |
| ADVERTISEMENT INFORMATION 3 · GENRE | LODGING (56) | 56 | |
| ADVERTISEMENT INFORMATION 3 · DISTRIBUTION DATE/TIME | SATURDAY · HOLIDAY (3) | 3 | |
| ADVERTISEMENT INFORMATION 3 · RECEPTION INTENSITY | LOW (1) | 1 | |

TO FIG. 12B

FIG. 12B
FROM FIG. 12A

| | | |
|---|---|---|
| ADVERTISEMENT LINK SELECTION LOG | logAD23415.doc | ADVERTISEMENT CLICK LOG |
| E-MAIL TRANSMISSION/RECEPTION OPTION | Yes | TRANSMISSION/RECEPTION OPTION TO MAIL ADDRESS OTHER THAN SERVER SETTING |
| E-MAIL TRANSFER OPTION | Yes | TRANSFER OPTION TO MAIL ADDRESS OTHER THAN SERVER SETTING |
| TRANSFER DESTINATION MAIL ADDRESS | keitai_yamada@△△△x.co.jp | TRANSFER TO CELLULAR PHONE |
| TRANSFER SET TIME ZONE | 09:00-22:00 | TRANSFER SET TIME ZONE |
| ISSUED TPCN MAIL ADDRESS | tpcn_yamada@□□□.co.jp | ORDINARY MAIL ADDRESS ISSUED BY SERVER |
| REGISTRATION DATE | 2000.06.15 | |
| ARTICLE MAIL RECEPTION TIME 1 | 3:00AM | SETTING OF MORNING PAPER |
| ARTICLE MAIL DISTRIBUTION SET TIME 1 | 5:00AM | SETTING OF MORNING PAPER |
| ARTICLE MAIL RECEPTION LOG 1 | logNews1.doc | ARTICLE URL CLICK LOG |
| ARTICLE MAIL DISTRIBUTION LOG 1 | log23415_01.doc | TRANSMISSION LOG OF DISTRIBUTION ARTICLE |
| ARTICLE MAIL DISTRIBUTION REQUEST TIME 2 | 3:00PM | SETTING OF EVENING PAPER |
| ARTICLE MAIL DISTRIBUTION SET TIME 2 | 5:00PM | SETTING OF EVENING PAPER |
| ARTICLE MAIL RECEPTION LOG 2 | logNews2.doc | ARTICLE URL CLICK LOG |
| ARTICLE MAIL DISTRIBUTION LOG 2 | log23415_02.doc | TRANSMISSION LOG OF DISTRIBUTION ARTICLE |
| ARTICLE DOWNLOAD SET TIME 3.1 | 3:00AM | News SERVER → TPCN SERVER |
| ARTICLE DOWNLOAD SET TIME 3.2 | 5:00AM | TPCN SERVER → READER |
| ARTICLE SITE DOWNLOAD LOG 3.1 | logNews3.doc | |
| ARTICLE SITE DOWNLOAD LOG 3.2 | log23415_3.doc | |
| ARTICLE NO. CONVERSION TABLE LOG | tbl23415.tbl | CONVERSION TABLE OF ORIGINAL CONTENTS CODE OF DISTRIBUTION ARTICLE → CUSTOM CONTENTS CODE |

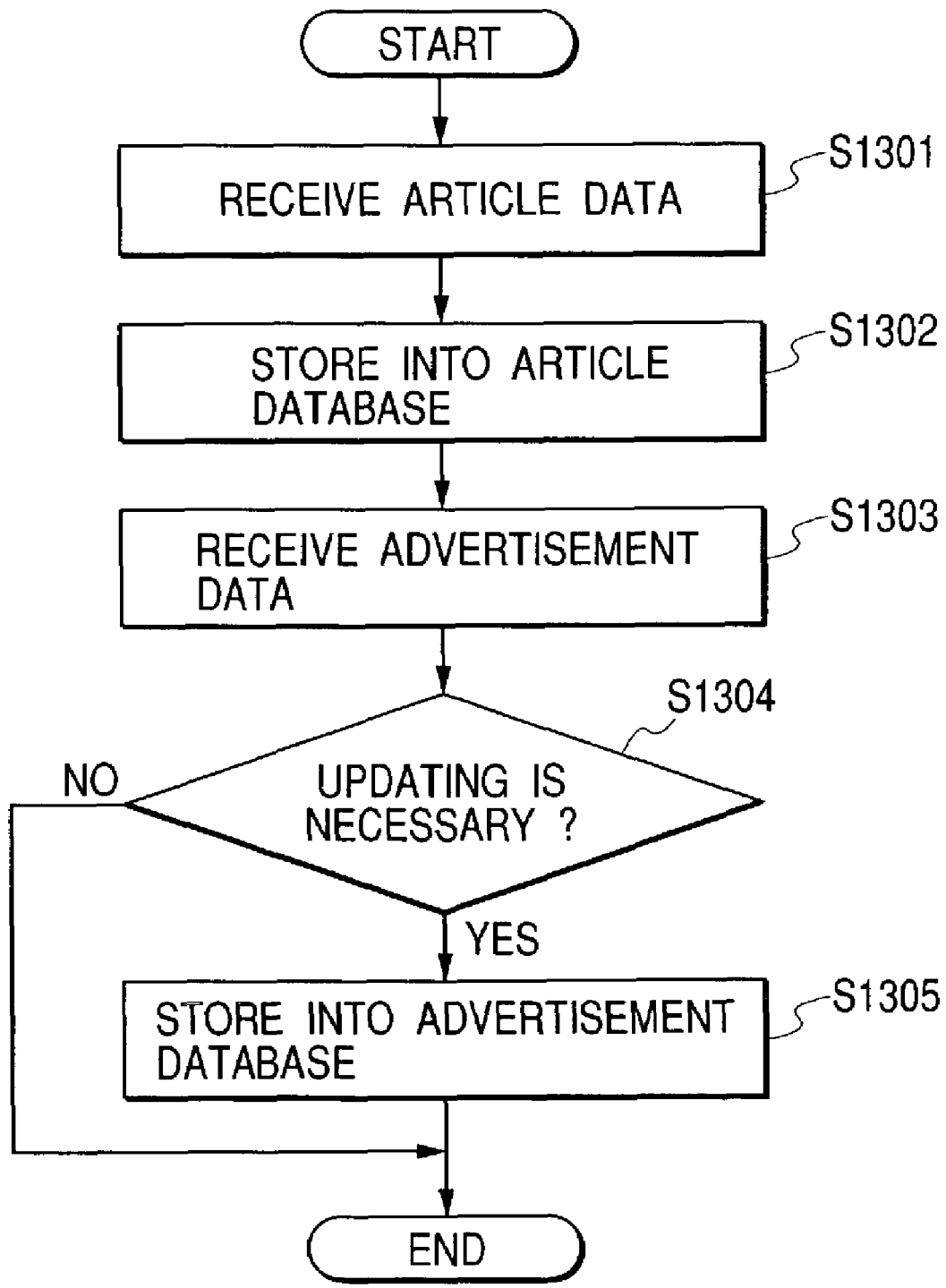

FIG. 14

```
DISTRIBUTING SOURCE NO.: 121
DISTRIBUTION DATE/TIME: 2000.07.20
DISTRIBUTION NO.: 001
APPLYING AREA: World Wide
GENRE: POLITICS
DISTRIBUTION INTENSITY: HIGH
TITLE: MR. Y WON THE ELECTION TO THE PRIME MINISTER OF X COUNTRY
SUMMARY: ON JULY 19, 2000,... TO THE PRIME MINISTER OF X COUNTRY
DETAILED ARTICLE STORING LOCATION: http://www.enews.△△△.co.jp/...
DETAILED ARTICLE FILE NAME: article001.article
ANNEXED IMAGE: img001.jpg
DISTRIBUTION NO.: 002
APPLYING AREA: DOMESTIC
GENRE: ECONOMICS
DISTRIBUTION INTENSITY.: LOW
TITLE: THERE IS A TENDENCY THAT THE COMMUNICATION FEE OF SINGLE
       GENERATION IS STILL INCREASING
SUMMARY: THE COMMUNICATION FEE BY CELLULAR PHONE...OF
         HOUSEHOLD ECONOMY OF SINGLES
DETAILED ARTICLE STORING LOCATION: http://www.enews.△△△.co.jp/...
DETAILED ARTICLE FILE NAME: article002.article
ANNEXED IMAGE: NONE
:
:
FILE ANNEX AREA: ...
:
:
```

FIG. 15

| ITEM | REPRESENTATION DATA | DATA CODE (STORAGE DATA IN DB) |
|---|---|---|
| ORIGINAL CONTENTS CODE | 00-20000720-000103-0001 | 00-20000720-000103-0001 |
| DISTRIBUTING SOURCE | A NEWSPAPER COMPANY | 0 |
| DISTRIBUTION DATE/TIME | 2000.07.20 | 20000720 |
| APPLYING AREA | | 0 |
| GENRE | POLITICS | 1 |
| DISTRIBUTION INTENSITY | HIGH | 3 |
| DISTRIBUTION NO. | 0001 | 0001 |
| TITLE | MR. Y WON THE ELECTION TO THE PRIME MINISTER OF X COUNTRY | title20000720_0001.doc |
| SUMMARY | | sumary20000720_0001.doc |
| DETAILED ARTICLE STORING LOCATION | http://www.enews.○△△△.co.jp/... | http://www.enews.○△△△.co.jp/... |
| DETAILED ARTICLE FILE | CONTINUED FROM THE LAST YEAR... | detail20000720_0001.pdf |
| ⋮ | | |
| ORIGINAL CONTENTS CODE | 04-20000720-037802-0012 | 04-20000720-037802-0012 |
| DISTRIBUTING SOURCE | F NEWSPAPER COMPANY | 4 |
| DISTRIBUTION DATE/TIME | 2000.07.20 | 20000720 |
| APPLYING AREA | WITHIN KEN | 3 |
| GENRE | BASEBALL | 78 |
| DISTRIBUTION INTENSITY | MIDDLE | 2 |
| DISTRIBUTION NO. | 0012 | 0012 |
| TITLE | | title20000720_0001.doc |
| SUMMARY | | sumary20000720_0001.doc |
| DETAILED ARTICLE STORING LOCATION | http://www.enews.○△△△.co.jp/... | http://www.enews.○△△△.co.jp/... |
| DETAILED ARTICLE FILE | UNDER THE FLAMING SUN | detail20000720_0012.pdf |

FIG. 16

```
DISTRIBUTING SOURCE NO. : 0
TRANSMISSION DATE/TIME : 2000.07.20
UPDATING FLAG. : Yes
DISTRIBUTION DATE/TIME : 2000.07.20
DISTRIBUTION NO. :001
BASE POINT ADDRESS : 1
APPLYING DISTRICT AREA : 2
DISTRIBUTION INTENSITY : MIDDEL
ADVERTISEMENT GENRE : SHOPPING
BASE POINT ADDRESS OF RECEPTION CONTRACTOR : HOME OR COMPANY
OR SHOPPING
ATTRIBUTE OF RECEPTION CONTRACTOR 1 : MALE
ATTRIBUTE OF RECEPTION CONTRACTOR 2 : TWENTIES
THE NUMBER OF TARGET CUSTOMERS OF ADVERTISEMENT DISTRIBUTION : 23456
ADVERTISEMENT TITLE : SALE ONLY FOR 3 DAYS FROM TODAY
ADVERTISEMENT IMAGE : tokubai.image
RELATED URL : http://www.o△△△o.co.jp/adv/tokubai.html
  :
  :
FILE ANNEX AREA : ...
  :
  :
```

FIG. 17

| ITEM | REPRESENTATION DATA | DATA CODE (STORAGE DATA IN DB) | REMARKS |
|---|---|---|---|
| ADVERTISER NO. | 0 | 0 | |
| ADVERTISER NAME | C CAMERA | C CAMERA | |
| BASE POINT ADDRESS | TOKYO-TO △△△ KU ○○○ | 1460092 | |
| APPLYING DISTRICT AREA 1 | 146-xxxx | 146***** | |
| APPLYING DISTRICT AREA 2 | 146-009x | 146009* | |
| APPLYING DISTRICT AREA 3 | 146-0092 | 1460092 | |
| THE NUMBER OF ADVERTISEMENTS | 1 | 1 | |
| ADVERTISEMENT NO. | 3975039 | 3975039 | |
| UPDATING INTERVAL | 7 | 7 | |
| ADVERTISER NO. | 1 | 1 | |
| ADVERTISER NAME | A SUPERMARKET STORE | A SUPERMARKET STORE | |
| BASE POINT ADDRESS | TOKYO-TO ×× KU ○○ | 1520031 | |
| APPLYING DISTRICT AREA 1 | 152-xxxx | 152***** | |
| APPLYING DISTRICT AREA 2 | 152-009x | 152009* | |
| APPLYING DISTRICT AREA 3 | 152-0092 | 1520092 | |
| THE NUMBER OF ADVERTISEMENTS | 1 | 1 | |
| ADVERTISEMENT NO. | 2459023 | 2459023 | |
| UPDATING INTERVAL | 3 | 3 | |
| ‥ | ‥ | ‥ | ‥ |

FIG. 18

ADVERTISEMENT DB

| ITEM | REPRESENTATION DATA | DATA CODE (STORAGE DATA IN DB) | REMARKS |
|---|---|---|---|
| ADVERTISEMENT NO. | 3975039 | 3975039 | |
| ADVERTISER NAME | C CAMERA | 0 | |
| TRANSMISSION DATE/TIME | 2000.07.20 | 20000720 | |
| DISTRIBUTION NO. | 1 | 1 | |
| DISTRIBUTION DATE/TIME | 2000.07.20 | 20000720 | |
| BASE POINT ADDRESS | TOKYO-TO △△△ KU ○○○ | 146-8501 | |
| APPLYING DISTRICT AREA | 2 | 2 | |
| DISTRIBUTION INTENSITY | MIDDLE | 2 | |
| ADVERTISEMENT GENRE | SHOPPING | 5 | |
| BASE POINT ADDRESS OF RECEPTION CONTRACTOR | HOME OR COMPANY OR SHOPPING | 0, 1, 5 | |
| ATTRIBUTE OF RECEPTION CONTRACTOR 1 | MALE | 0 | |
| ATTRIBUTE OF RECEPTION CONTRACTOR 2 | TWENTIES | 20 | |
| MAX. NUMBER OF CUSTOMERS OF ADVERTISEMENT DISTRIBUTION | 23456 | 23456 | |
| ADVERTISEMENT TITLE | SALE OF MAIN BODY ONLY FOR 3 DAYS FROM TODAY | tokubai.title | |
| ADVERTISEMENT IMAGE | tokubai.image | tokubai.image | |
| THE ACTUAL NUMBER OF CUSTOMERS OF ADVERTISEMENT DISTRIBUTION | 23456 | 23456 | |
| ⋯ | ⋯ | ⋯ | ⋯ |

FIG. 20

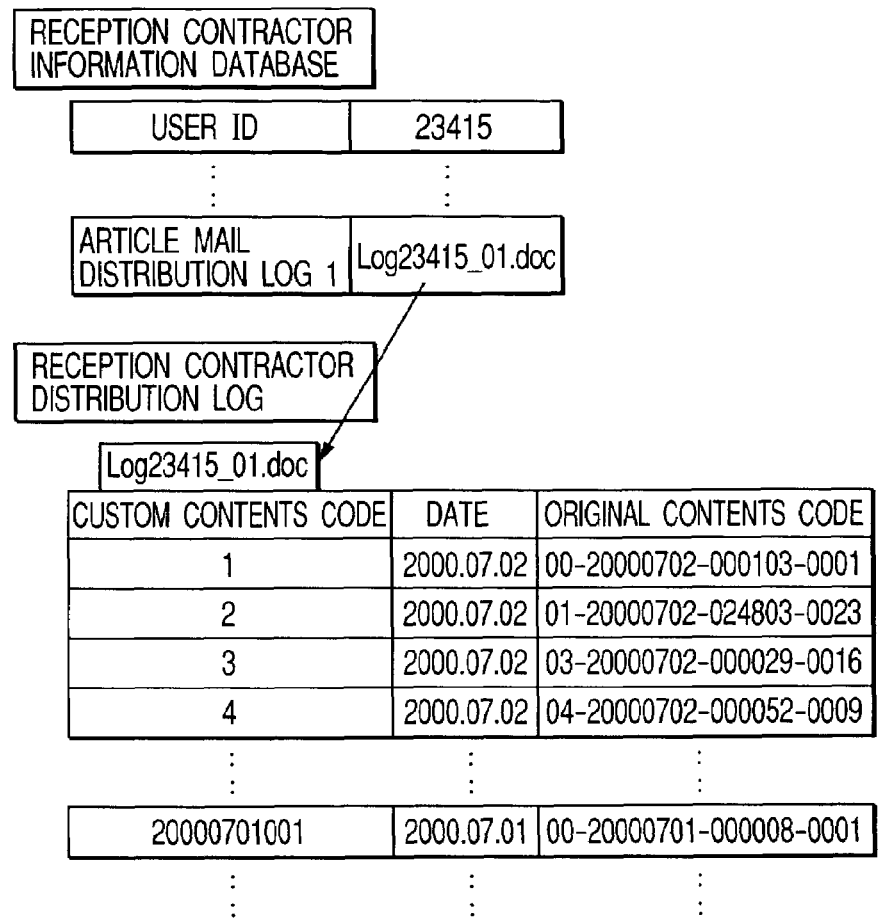

FIG. 21

DISTRIBUTION DECISION MATRIX BASED ON RELATION BETWEEN READER'S TASTE (RECEPTION INTENSITY) AND ADVERTISEMENT SIGNIFICANCE RANK (DISTRIBUTION INTENSITY)

DISTRIBUTION INTENSITY →

| RECEPTION INTENSITY ↑ | HIGHT | MIDDLE | LOW |
|---|---|---|---|
| HIGHT | DISTRIBUTE | DISTRIBUTE | DISTRIBUTE |
| MIDDLE | DISTRIBUTE | DISTRIBUTE | NOT DISTRIBUTE |
| LOW | DISTRIBUTE | NOT DISTRIBUTE | NOT DISTRIBUTE |

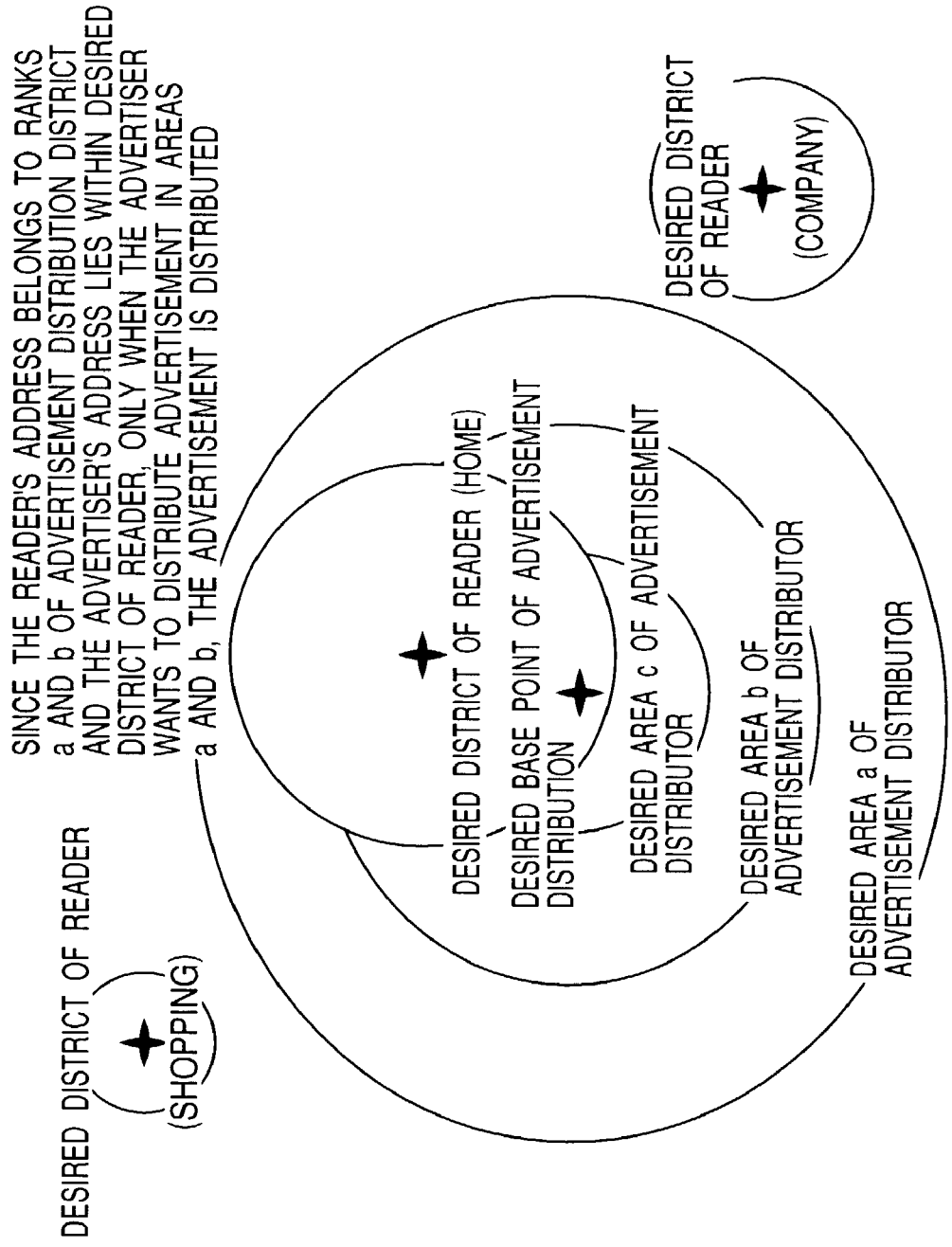

FIG. 24

DISTRIBUTION DECISION MATRIX BASED ON
RELATION BETWEEN READER'S TASTE
(DESIRED COLOR DEGREE) AND ADVERTISEMENT
SIGNIFICANCE RANK (COLOR PRIORITY)

COLOR PRIORITY ←

| | LARGE | NORMAL | SMALL |
|---|---|---|---|
| A | COLOR OUTPUT | COLOR OUTPUT | COLOR OUTPUT |
| B | COLOR OUTPUT | COLOR OUTPUT | MONOCHROMATIC OUTPUT |
| C | COLOR OUTPUT | MONOCHROMATIC OUTPUT | MONOCHROMATIC OUTPUT |

DESIRED COLOR DEGREE ↑

FIG. 26

| ITEM | REPRESENTATION DATA | DATA CODE (STORAGE DATA IN DB) | REMARKS |
|---|---|---|---|
| PRINTER NAME | LBP-1000 | LBP-1000 | |
| IMAGE MODE | STANDARD | | 2 |
| CONSUMPTION AMOUNT PER UNIT AREA (CHARACTERS) | 2pico-g | | 2 |
| CONSUMPTION AMOUNT PER UNIT AREA (IMAGE DATA) | 2pico-g | | 20 |

FIG. 29A

CARTRIDGE EXCHANGE
TIMING WILL SOON COME

RESIDUAL TONER AMOUNT OF MACHINE NAME
WHICH THE USER USES IS SMALL
(* OR, THE RESIDUAL TONER AMOUNT IS ___%)

THE PRESUMED EXCHANGE TIMING WILL BE
AS FOLLOWS
DURING THE INTERVAL OF ** YEAR  MONTH
 DAY –  YEAR  MONTH ** DAY

MAY I DELIVER NEW CARTRIDGE FOR
EXCHANGE?

2901 — [YES]   [NO] — 2902

* IF YES IS SELECTED, THE SCREEN IS
CHANGED TO PICTURE PLANE FOR
ADJUSTMENT OF VISIT DATE (DELIVERY DATE)

IF NO, THIS PICTURE PLANE IS
DISPLAYED AGAIN AFTER THE
ELAPSE OF PREDETERMINED TIME

FIG. 29B

THE VISIT DATE (DELIVERY DATE) WILL BE ADJUSTED

PRESUMED EXCHANGE PERIOD
DURING THE INTERVAL OF ** YEAR  MONTH
 DAY –  YEAR  MONTH ** DAY

PLEASE ENTER YOUR REQUEST DATE

<FIRST REQUEST>
☐YEAR ☐MONTH ☐DATE – ☐MONTH ☐DATE

TIME ZONE: ☐HOURS – ☐HOURS

<SECOND REQUEST>
☐YEAR ☐MONTH ☐DATE – ☐MONTH ☐DATE

TIME ZONE: ☐HOURS – ☐HOURS

[SEND]  [CANCEL]
   2903

IN CASE OF "SEND", ANSWER
AFTER ADJUSTMENT (TO FIG. 30)

IF YES

IN CASE OF CANCELLATION, RETURN

FIG. 31

```
DISTRIBUTING SOURCE NO.: 121
DISTRIBUTION DATE/TIME: 2000.07.20
DISTRIBUTION NO.: 001
APPLYING AREA: World Wide
GENRE: POLITICS
DISTRIBUTION INTENSITY: HIGH
TITLE: MR. Y WON THE ELECTION TO THE PRIME MINISTER OF X COUNTRY
SUMMARY: ON JULY 19, 2000,... TO THE PRIME MINISTER OF X COUNTRY...
DETAILED ARTICLE STORING LOCATION: http://www.x△o.co.jp/...
DETAILED ARTICLE FILE NAME: article001.article
ANNEXED IMAGE: img001.jpg
DISTRIBUTING NO.: 002
APPLYING AREA: DOMESTIC
GENRE: ECONOMICS
DISTRIBUTION INTENSITY.: LOW
TITLE: THERE IS A TENDENCY THAT THE COMMUNICATION FEE OF SINGLE
       GENERATION IS STILL INCREASING
SUMMARY: THE COMMUNICATION FEE BY CELLULAR PHONE...OF
         HOUSEHOLD ECONOMY OF SINGLES
DETAILED ARTICLE STORING LOCATION: http://www.x△o.co.jp/...
DETAILED ARTICLE FILE NAME: article002.article
```
3201 — THE NUMBER OF RELATED ARTICLES: 2
3202 — RELATED ARTICLE 1:
```
            RELATING FORM: PAST ARTICLE
            DISTRIBUTING SOURCE NO.: 121
            DISTRIBUTION DATE/TIME: 2000.07.15
            DISTRIBUTION NO.: 003
```
3203 — RELATED ARTICLE 2:
```
            RELATING FORM: URL
            RELATED URL: http://www.o△o.xxx/xxx...
ANNEXED IMAGE: NONE
  :
  :
FILE ANNEX AREA: ...
  :
  :
```

CONTENTS DISTRIBUTING SERVER, CONTENTS DISTRIBUTION CONTROL METHOD, PROGRAM, AND RECORDING MEDIUM

BACKGROUND OF THE INVENTION

1. Field of the Invention

The invention relates to a contents distributing server, a contents distribution control method, a program, and a recording medium in a distributing system for distributing various contents to user terminals.

2. Related Background Art

In association with progress of information technology, it is an important subject in enterprise activities or the like to efficiently obtain latest information.

In newspapers which are sold at present, articles and advertisements have been predetermined in dependence on a district where a reader purchases the newspaper. For example, when the reader wants to read district information of a place near a workplace, if he is subscribing to the newspaper in the district of his home, he cannot read such district information, or the like. Articles which the reader wants to read are not always distributed to him, or the newspapers are not always distributed to the readers by whom an advertiser wants his advertisement to be read.

In recent years, owing to the spread of the Internet, each newspaper company, a portal site, or the like has distributed articles on the Internet with or without charge.

For example, according to the technique disclosed in JP-A-9-50441, a mechanism such that information which includes newspaper articles and enterprise advertisements selected in accordance with attributes or the like of the customers is run onto a picture plane has been proposed.

SUMMARY OF THE INVENTION

However, even if the foregoing mechanism is used, for example, articles, advertisements, and the like of districts where the reader often makes purchase other than the district where he lives at present are not always run.

An investment in stocks, bond, or the like, a change of job, an enterprise seminar, a business magazine, or the like is considered as media which is concerned with advertisements regarding economic articles. However, a person who reads the economic articles does not always make a stock transaction or want to change a job.

As mentioned above, even if the foregoing method is used, the articles and advertisements are not always efficiently distributed in dependence on an action district, action contents, a taste, and the like of the reader in accordance with intentions of both of an advertisement inserting enterprise and the reader.

That is, if the attributes of the contents are merely classified, the articles which the reader desires are not always efficiently inserted or a maximum advertising effect for allowing the advertisement to result in purchase is not always obtained.

On the other hand, in case of conventional electronic newspaper, since it is presumed that it is watched on a display as shown in the technique disclosed in JP-A-9-64976 or the like, if it is intended to insert more information, the number of clicks which are operated to see the articles which the reader wants to read increases, the operation to search them by entering a keyword is caused, or the like. Thus, the necessary article cannot be searched in a short time.

Further, if either a color output or a monochromatic output regarding articles or advertisements of the electronic newspaper has been selected and determined on the basis of only a demand of a distributor, they are distributed by an amount of data which is distributed to the reader and at print costs upon printing as they are in dependence on the demand of the distributor, so that the desire of the reader is not reflected at all.

On the other hand, in case of printing the electronic newspaper by a printer, print costs for consumables (toner, ink, etc.) in association with the printing of the advertisements become a burden on the reader.

Since the reader periodically receives the electronic newspaper, it is desirable that management of exchange timing of consumables (toner cartridge, ink cartridge, etc.) of the printer which is used to print the electronic newspaper can be confirmed at the time of reception of the electronic newspaper.

To accomplish the above objects, according to the invention, a mechanism such that contents which are extracted from a contents database added with attributes are distributed to an information processing apparatus which is used by the user is provided. Specifically speaking, there is provided a mechanism such that information of a desired distribution intensity is included in the contents, reception intensity information showing a reception intensity of three levels or more which were set via a user interface for setting a desire of the contents displayed in a display unit of an information processing apparatus which is used by the user is managed on a distributing server side, in case of distributing the contents, distribution intensity information included in the attributes of the contents stored in the contents database is compared with the reception intensity information of three levels or more which is managed on the distributing server side in accordance with an instruction from the user, and the distribution of the contents is controlled in accordance with a result of the comparison.

Thus, a desire on the side who provides the contents and a desire on the side who receives the contents can be made to coincide more accurately, and a mechanism for urging circulation of more useful information can be realized.

BRIEF DESCRIPTION OF THE DRAWINGS

FIG. 5 is a schematic diagram of a new registration picture plane which is displayed on a screen of the client computer 112 on the basis of an instruction from the TPNC server 101 shown in FIG. 1;

FIG. 6 is a schematic diagram of an entering picture plane of a password for registration confirmation transmitted from the client computer 112 shown in FIG. 1 to the TPNC server 101;

FIG. 7 is a schematic diagram of an entering picture plane of contract information which is displayed on the screen of the client computer 112 on the basis of an instruction from the TPNC server 101 shown in FIG. 1;

FIG. 8 is a schematic diagram of an entering picture plane of contract information which is displayed on the screen of the client computer 112 on the basis of an instruction from the TPNC server 101 shown in FIG. 1;

FIG. 9 is a schematic diagram of an entering picture plane of contract information which is displayed on the screen of the client computer 112 on the basis of an instruction from the TPNC server 101 shown in FIG. 1;

FIG. 10 is a schematic diagram of an information entering picture plane of receiving conditions or the like for an advertisement layout which is displayed on the screen of the client computer 112 on the basis of an instruction from the TPNC server 101 shown in FIG. 1;

FIG. 11 which is composed of FIGS. 11A and 11B is a schematic diagram of distribution contract information which is related to a reception contractor 111 and stored by the TPNC server 101 shown in FIG. 1;

FIG. 12 which is composed of FIGS. 12A and 12B is a schematic diagram of distribution contract information which is related to a reception contractor 111 and stored by the TPNC server 101 shown in FIG. 1;

FIG. 13 is a flowchart for the operation which is executed by the TPNC server 101 in the electronic newspaper system with the advertisement shown in FIG. 1 in order to receive and store articles distributed from news servers 121 to 126 and advertisements distributed from advertisement servers 131 to 133;

FIG. 14 is a schematic diagram of data of an article which is transmitted from the news server 121 shown in FIG. 1 to the TPNC server 101;

FIG. 15 is a conceptual diagram in the case where the TPNC server 101 shown in FIG. 1 stores article data;

FIG. 16 is a schematic diagram of data of updating information which is transmitted from the advertisement server 131 shown in FIG. 1 to the TPNC server 101;

FIG. 17 is a conceptual diagram of data of an advertiser which is stored into a database of the TPNC server 101 shown in FIG. 1;

FIG. 18 is a schematic diagram of a storing format in case of storing advertisement data into the database of the TPNC server 101 shown in FIG. 1;

FIG. 20 is a conversion table of allocated custom contents codes and original contents codes which is used in the electronic newspaper system with the advertisement shown in FIG. 1;

FIG. 21 is a conceptual diagram of conditions at the time of extracting advertisement data in the electronic newspaper system with the advertisement shown in FIG. 1;

FIG. 22 is a conceptual diagram of conditions at the time of extracting advertisement data in the electronic newspaper system with the advertisement shown in FIG. 1;

FIG. 24 is a conceptual diagram of conditions at the time of determining either the color output or the monochromatic output of the distribution data in the electronic newspaper system with the advertisement shown in FIG. 1;

FIG. 26 is a schematic diagram of data of printer information per type of printer of the TPNC server 101 shown in FIG. 1;

FIG. 29A is a schematic diagram of a notifying picture plane of the exchange timing of the toner cartridge;

FIG. 29B is a schematic diagram of a delivery form picture plane;

FIG. 31 is a conceptual diagram of an article data format added with items regarding related articles which are distributed from the news server to the TPNC server 101;

DETAILED DESCRIPTION OF THE PREFERRED EMBODIMENTS

Figure 1:
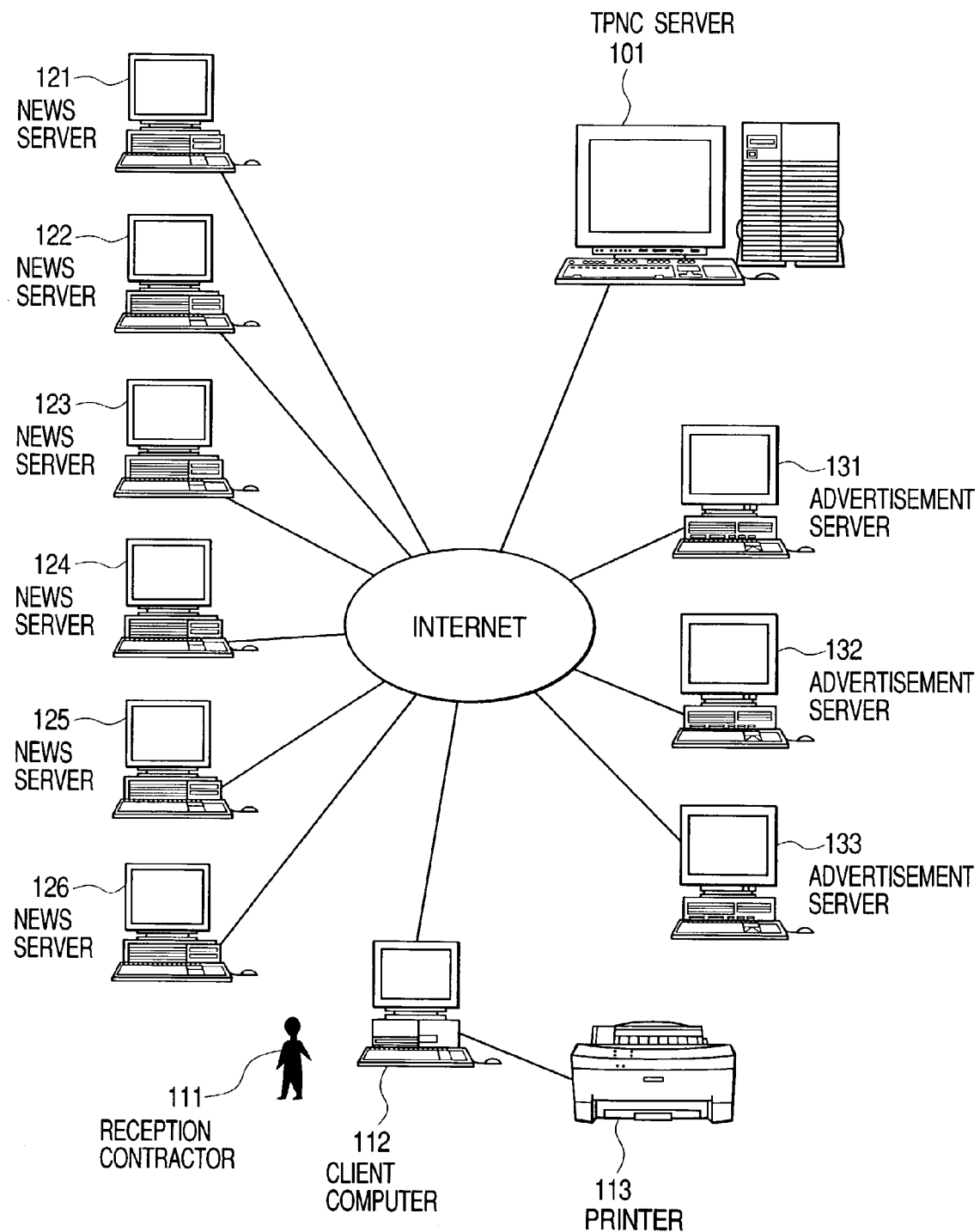
FIG. 1 is a schematic constructional diagram of an electronic newspaper system with an advertisement according to the first embodiment.

Preferred embodiments of the present invention will be described in detail as examples hereinbelow with reference to the drawings. Dimensions, materials, shapes, relative arrangement, and the like of component parts disclosed in the embodiments do not limit the scope of claims of the invention unless otherwise specified in particular.

In the following drawings, component elements similar to those disclosed in the foregoing drawings are designated by the same reference numerals. An explanation of each of the following embodiments of a contents distributing system according to the invention is also used in common with an explanation of each embodiment of a server, an information transmitting method, a program, and a computer-readable recording medium on which the program has been recorded according to the invention.

First Embodiment

First, the first embodiment of a contents distributing system according to the invention will be described with reference to the drawings. As kinds of contents in the invention, for example, the invention can be applied to various forms such as an E-mail magazine of predetermined contents, contents regarding hobbies, and the like and is not limited to the kinds of contents. In the embodiments, it is assumed that an electronic newspaper system with an advertisement will be described as an example. FIG. 1 is a schematic constructional diagram of an electronic newspaper system with an advertisement according to the first embodiment.

The electronic newspaper system with the advertisement according to the embodiment is a system such that an electronic newspaper which has been customized every reception contractor is distributed and managed and procedures for registration of readers, distribution and reception of articles, and management of the readers are executed on the Internet.

A Total Provider of News Contents (hereinafter, abbreviated to "TPNC") server 101 shown in FIG. 1 functions as a server serving as a component element of the invention. The TPNC server 101 edits information and advertisement information and distributes (transmits) them to a client computer 112 as a client serving as a component element of the invention.

The client computer 112 is a computer which is operated by a reception contractor 111 as a user who receives the information. The client computer 112 corresponds to an apparatus serving as a main body for receiving (signal reception) information for displaying contents in the invention. Since an internal block diagram of the client computer 112 has a mechanism similar to that of FIG. 2, which will be explained hereinlater, its detailed explanation is omitted here.

The reception contractor 111 is a reception contractor who made a reception contract with respect to the information transmission from the TPNC server 101.

The client computer 112 is a terminal which is used by the reception contractor 111.

A printer 113 is a printer connected to the client computer 112 which is used by the reception contractor 111.

The printer 113 functions as an image forming apparatus serving as a component element of the invention. The image forming apparatus serving as a component element of the invention is not limited to the printer but can be a printer having functions of a copying apparatus, a facsimile apparatus, and a scanner or a hybrid apparatus in which the printer and those apparatuses are combined.

Although the embodiment has been described with respect to a form such that a print output is executed by the printer 113 as an image forming apparatus, an image forming apparatus for outputting image data onto a screen or the like can be also used. As an image forming apparatus, for example, image data can be also outputted onto a screen of the portable paper-shaped display disclosed in JP-A-08-146388, JP-A-2000-132121, or the like.

News servers 121 to 126 are servers each for distributing articles (information) and providing news sources to the TPNC server 101.

Advertisement servers 131 to 133 are servers each for distributing (providing) advertisement information to the TPNC server 101.

The TPNC server 101, client computer 112, each news server, and each advertisement server are mutually connected via a network (Internet).

However, the network which is used in the invention is not limited to the Internet but another arbitrary network can be substituted or used together.

Either a wired or wireless type can be used as a network, or the wired network and the wireless network can be also combined.

Further, a portable terminal (cellular phone: PDA (Personal Digital Assistant)) or the like can be used in place of or together with the client computer 112 shown in FIG. 1.

The numbers of TPNC servers 101, client computers 112, news servers, and advertisement servers are not limited to those shown in FIG. 1 but can be set to another arbitrary number of one or more.

The TPNC server 101 preliminarily has attribute information and the like such as IP addresses regarding the news servers and the advertisement servers, mail addresses for transmitting and receiving E-mail, and the like.

Figure 2:
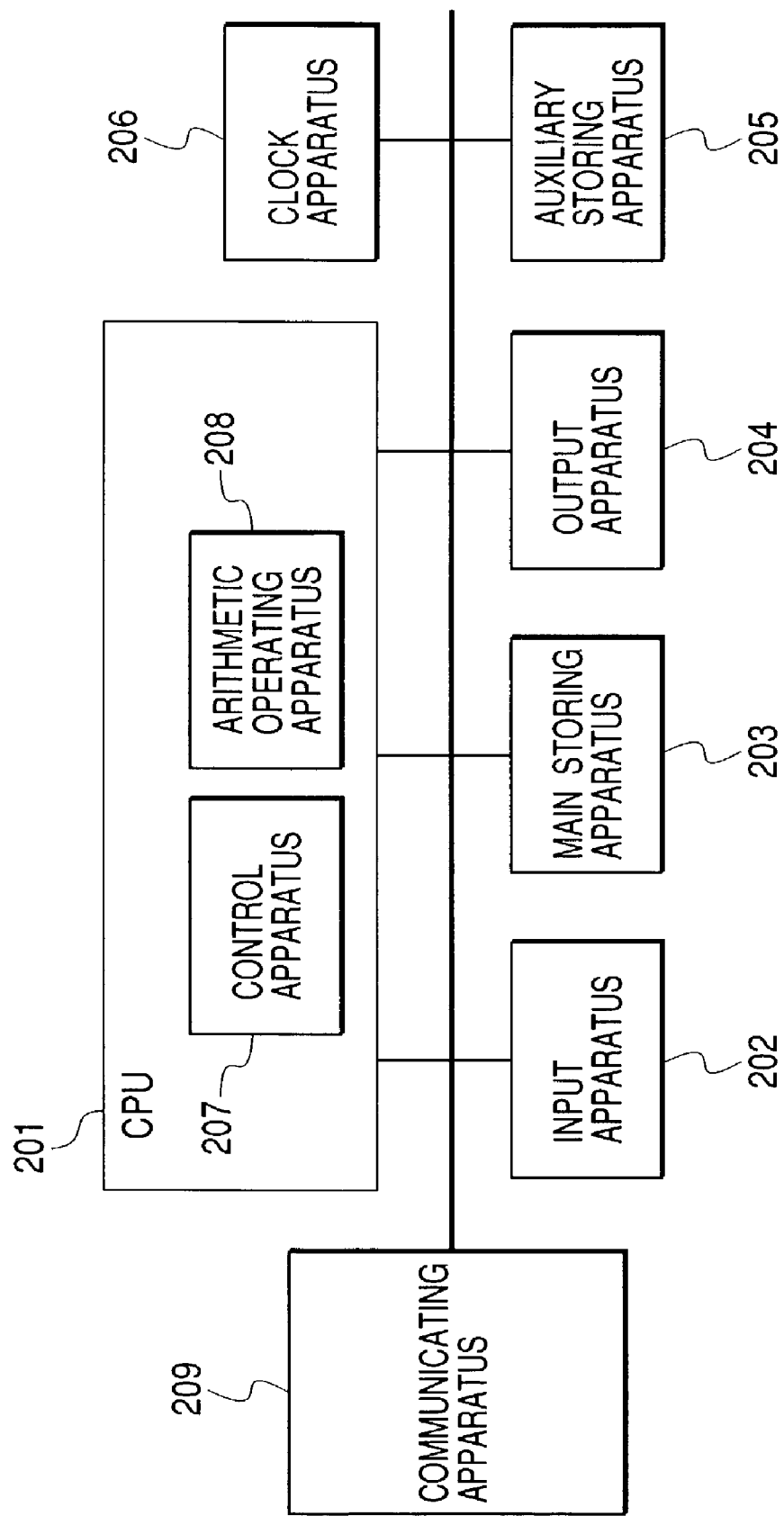
FIG. 2 is an internal block diagram of a TPNC server 101 which is used in the electronic newspaper system with the advertisement shown in FIG. 1.

An internal structure of the TPNC server 101 shown in FIG. 1 will now be described with reference to FIG. 2. FIG. 2 is an internal block diagram of the TPNC server 101 which is used in an information distributing system shown in FIG. 1.

As shown in FIG. 2, the TPNC server 101 comprises a CPU (Central Processing Unit) 201, an input apparatus 202, a main storing apparatus 203, an output apparatus 204, an auxiliary storing apparatus 205, a clock apparatus 206, and a communicating apparatus 209.

The CPU 201 is a member known as a processing unit and comprises: a control apparatus 207 for sending a command to each apparatus in the system and controlling the operation thereof; and an arithmetic operating apparatus 208 for executing an arithmetic operating process of digital data in a central portion of the server.

In cooperation with programs stored in the main storing apparatus 203 and auxiliary storing apparatus 205, the CPU 201 functions as managing means, discriminating means, means for presuming an amount of consumables, means for calculating an amount of money according to the amount of consumables, means for calculating timing for exchanging the consumables, and notifying means serving as component elements of the invention. With respect to details of the consumables in the embodiment, in addition to the toner cartridge as consumables which are consumed in an output of the contents, toner for a copying apparatus, a photosensitive drum, ink for an ink-jet printer, other consumable parts of the main body, paper, OHP sheets, and the like can be mentioned as examples.

Each of the managing means, the discriminating means, the means for presuming the amount of consumables, the means for calculating the money amount according to the amount of consumables, the means for calculating the exchange timing of the consumables, and the notifying means as component elements of the invention can be constructed integratedly with the TPNC server 101 by the CPU 201 as mentioned above or can be also connected to the TPNC server 101 by the network and constructed independent of the TPNC server 101.

Further, the CPU 201 functions as storing means for storing information into the main storing apparatus 203 and auxiliary storing apparatus 205 and updating means for updating the information stored therein.

The function of each of the above means can be also realized by a method whereby the CPU 201 executes them in cooperation with the programs stored in the main storing apparatus 203 and output apparatus 204.

In the case where the internal block diagram shown in FIG. 2 is applied to the client computer 112, the CPU 201 functions as receiving means for receiving the information or advertisement information in cooperation with the communicating apparatus 209.

The control apparatus 207 reads data inputted from the input apparatus 202 or a procedure (for example, program or software) which has previously been given and stores it into the main storing apparatus 203 in accordance with timing of clocks which are generated by the clock apparatus 206. The control apparatus 207 sends a command to the arithmetic operating apparatus 208 and allows it to execute an arithmetic operating process on the basis of the read contents. A result of the arithmetic operating process is transmitted to an internal apparatus such as main storing apparatus 203, output apparatus 204, auxiliary storing apparatus 205, or the like, an external apparatus, or the like on the basis of the control of the control apparatus 207.

The input apparatus 202 is a member for inputting various data and constructed by, for example, a keyboard, a mouse, a pointing device, a touch panel, a mouse pad, a CCD camera, a card reader, or the like.

The main storing apparatus 203 is a member known as a memory and is a member for indicating all of address-possible memory spaces which are used for executing the commands in a processing apparatus and an internal storing apparatus. The main storing apparatus 203 is constructed mainly by a semiconductor memory device, stores and holds the inputted programs and data, reads out the stored and held data, and stores them into, for example, a register in accordance with an instruction of the control apparatus 207.

The semiconductor memory device constructing the main storing apparatus 203 comprises an RAM (Random Access Memory), an ROM (Read Only Memory), or the like.

The output apparatus 204 is a member for outputting the arithmetic operation result or the like of the arithmetic operating apparatus 208. For example, a display apparatus such as CRT, plasma display panel, liquid crystal display, or the like, a printing apparatus such as a printer or the like, a voice output apparatus, or the like corresponds to the output apparatus 204.

The auxiliary storing apparatus 205 is a member for compensating a memory capacity of the main storing apparatus 203. For example, a floppy disk, a hard disk, a CD-ROM, a CD-R, a CD-RW, an MO, or the like according to a magnetic disk apparatus, an optical disk apparatus, a semiconductor disk apparatus, or the like corresponds to the auxiliary storing apparatus 205. The auxiliary storing apparatus 205 can become a database.

The communicating apparatus 209 is an apparatus for communicating with an external network and properly executes transmission and reception, a digital/analog conversion, or the like of data in accordance with a network which is connected.

Each of the foregoing apparatuses is mutually connected by an address bus or a data bus.

The numbers of main storing apparatuses 203 and auxiliary storing apparatuses 205 are not limited to one but can be set to an arbitrary number, respectively. If the numbers of main storing apparatuses 203 and auxiliary storing apparatuses 205 are increased, anti-failure performance of the server is improved in correspondence to them.

The various programs for allowing the TPNC server 101 according to the invention to execute the processes are stored (recorded) into at least either the main storing apparatus 203 or the auxiliary storing apparatus 205.

Therefore, at least either the main storing apparatus 203 or the auxiliary storing apparatus 205 corresponds to the computer-readable recording medium in which the program according to the invention for allowing the present server to execute the processes has been recorded. However, a CD-ROM, an FD, a CD-R, a CD-RW, or the like other than those storing apparatuses can be also used as a computer-readable recording medium in which the programs according to the invention have been recorded.

Although only the internal construction of the TPNC server 101 shown in FIG. 1 has been shown and described above, an internal construction of each of the client computer 112, news servers, and advertisement servers shown in FIG. 1 also has a construction similar to that shown in FIG. 2 and a similar explanation can be also applied.

Figure 3:
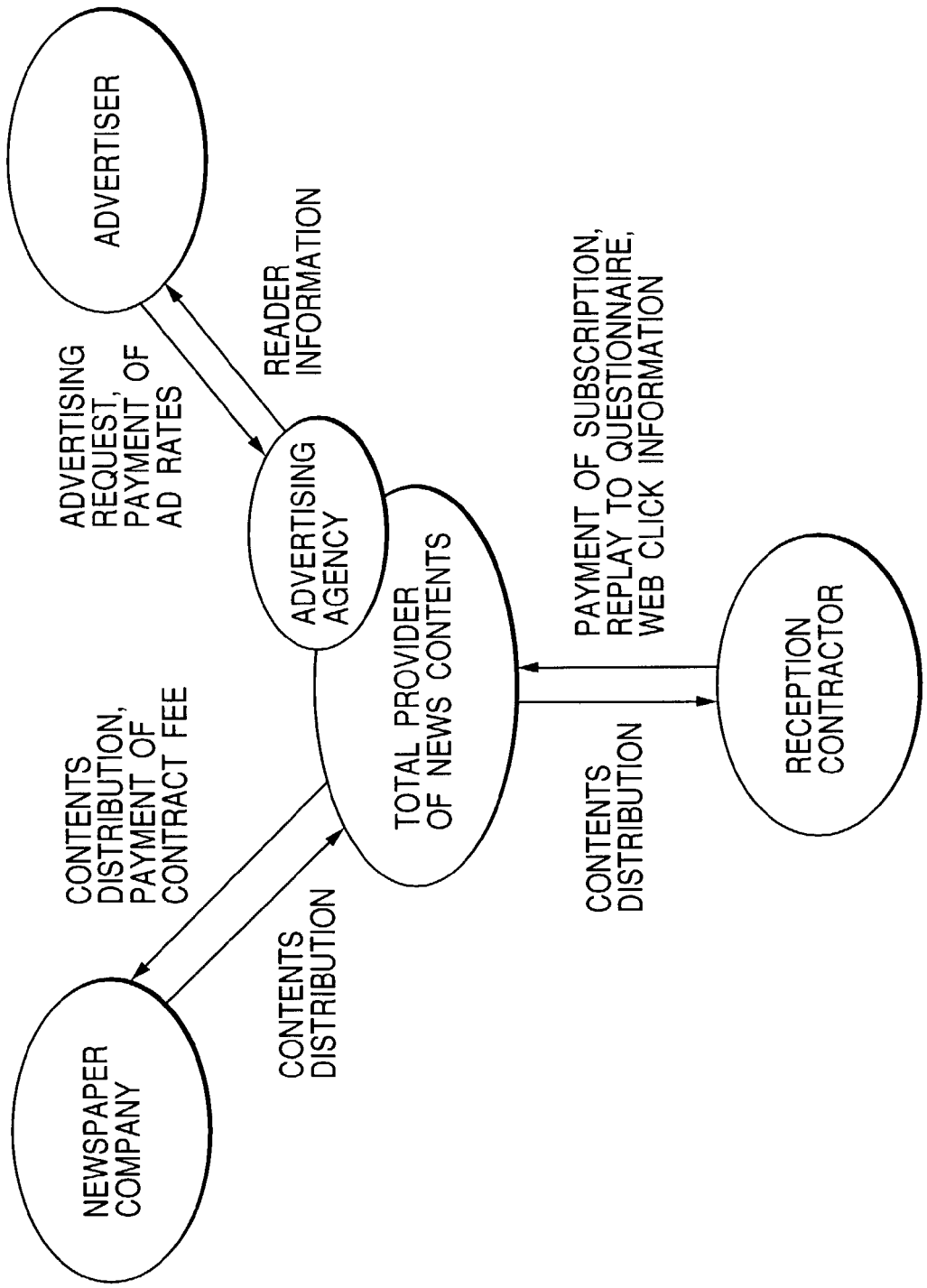
FIG. 3 is an operation conceptual diagram of the electronic newspaper system with the advertisement shown in FIG. 1.

Subsequently, the operation of the electronic newspaper system with the advertisement shown in FIG. 1 will be described with reference to FIG. 3. FIG. 3 is an operation conceptual diagram of the electronic newspaper system with the advertisement shown in FIG. 1.

Between the TPNC server 101 and a newspaper company (corresponding to the first distributor in the invention) which provides information, the TPNC server 101 receives the distribution of contents (document, image, program, data (music data or the like), or information including an arbitrary combination of them. They denote information as component elements of the invention and this point is similarly applied hereinbelow.) as first contents from the newspaper company and pays a contents distribution contract fee. Naturally, an information provider is not limited to the newspaper company but can be, for example, a magazine company or another party. For example, there is an advertisement or a questionnaire as second contents as a component element of the invention. It is assumed that the distribution of the contents from the newspaper company to the TPNC server 101 is realized actually by a method whereby an information processing apparatus which is used in the newspaper company executes a process for transmitting the contents information to the TPNC server 101 via a predetermined communication line (for example, communication line using an Internet communication network). Since an internal construction of the information processing apparatus which is used in the newspaper company has a mechanism similar to that described already in FIG. 2, its detailed explanation is omitted here.

With respect to a method of collecting/paying various fees in the embodiment (invention), a mechanism using the Internet or the like which has already been known and is used for E-commerce is considered.

For example, an example of an electronic settlement process (charging process) in association with charging between the newspaper company and the TPNC server 101 will now be explained.

A server having an electronic settlement function (hereinafter, referred to as an electronic settlement server) obtains approval information including authentication data (for example, a card number of a credit card of the TPNC server 101 and a personal identification number corresponding to the card number) received from a terminal apparatus (for example, an information processing apparatus which is used by the newspaper company) on the partner destination side and a charged amount (cost of a product) to a finance company (credit company). An examination is performed on the basis of the obtained authentication data. For example, if it is confirmed that the credit card is not a card in which a theft report is not given, this result is formed as approval result notice information. The cost according to the charged amount is paid (transfer instruction to a predetermined account) from the electronic settlement server to the newspaper company.

If it is confirmed that the card was illegally used or the payment is impossible, approval result notice information showing approval refusal is formed without paying for the cost. A process to transmit the formed approval result notice information to the information processing apparatus which is used by the newspaper company is executed. The card company collects, on its own responsibility, the cost paid by the card company from the customer.

If the collection/payment of the fee using the Internet or the like cannot be executed or the like, the invention also presumes a form of using a mechanism such as withdrawal of the fee via a financial institution according to a distribution amount (the number of contents, contents information amount, or the like) of contents to each distribution destination recorded by the TPNC server 101 (storage into memory means), payment of the fee via the financial institution according to a reception amount of the contents information (the number of contents, an amount of contents information, etc.) from each distributing source, or the like.

Between the TPNC server 101 and the advertiser (corresponding to the second distributor in the invention), the TPNC server 101 receives an advertising request from the advertiser and executes a request for ad rates, a reception thereof, a transmission of information regarding the reader, and the like. The transmission and reception to/from the advertiser can be also executed via an advertising agency as shown in FIG. 3.

The advertiser in the invention (embodiment) corresponds to the information processing apparatus which is actually used by each advertiser. Since an internal construction of the information processing apparatus has a mechanism similar to that of the information processing apparatus described already in FIG. 2, its detailed description is omitted here. That is, it is assumed that the distribution of various contents information from the advertiser is realized by a method whereby the information processing apparatus which is used by the advertiser executes a process to transmit information for displaying the contents to the TPNC server 101 via the predetermined communication line (for example, communication line or the like using the Internet communication network).

Between the TPNC server 101 and the reception contractor, the TPNC server 101 distributes the contents to the reception contractor and executes a request and a reception of a subscription from the reception contractor, a request of updating customer information, and the like.

Subsequently, the operation which is executed in the case where the reception contractor 111 makes a reception contract with the TPNC server 101 in the electronic newspaper system with the advertisement shown in FIG. 1 will be described with reference to FIG. 4. Among processing steps of a flowchart shown in FIG. 4, it is assumed that the operation which is processed by the client computer 112 is realized by a method whereby the CPU of the client computer 112 reads and executes a program stored in a non-volatile memory and the operation which is processed by the TPNC server 101 is realized by a method whereby the CPU 201 of the TPNC server 101 reads and executes a program stored in the non-volatile memory.

Figure 4:
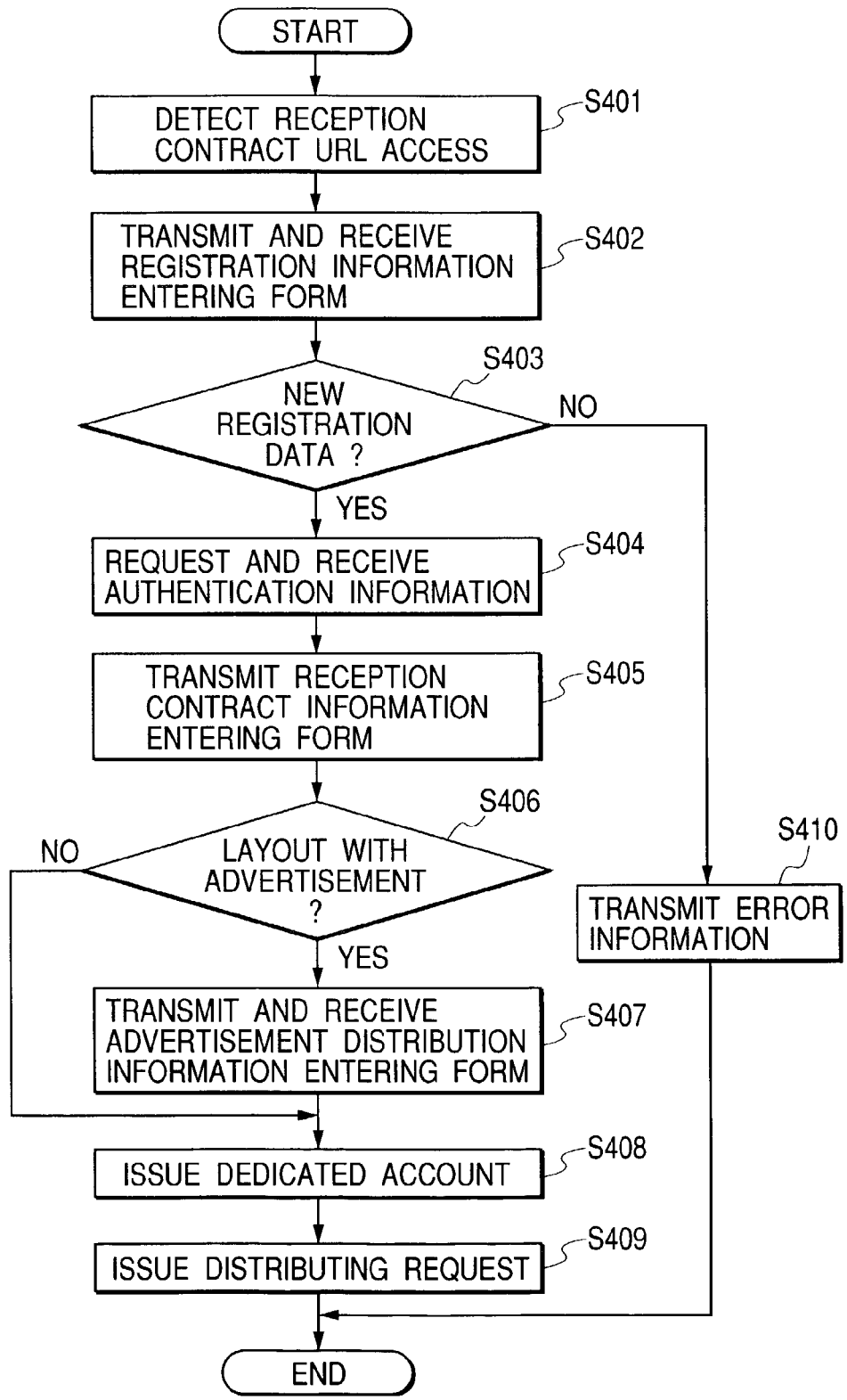
FIG. 4 is a flowchart for the operation which is executed in the case where a client computer 112 of a reception contractor 111 makes a reception contract with the TPNC server 101 in the electronic newspaper system with the advertisement shown in FIG. 1.

FIG. 4 is a flowchart for the operation which is executed in the case where the client computer 112 of the reception contractor 111 makes a reception contract with the TPNC server 101 in the electronic newspaper system with the advertisement shown in FIG. 1. That is, FIG. 4 is a flowchart for the operation for the reception contractor who will make a reception contract from now on (however, in the explanation of FIG. 4, it denotes a person who will make a reception contract from now on and does not mean a person who has already finished the making of a reception contract).

First, in step S401, the client computer 112 of the reception contractor 111 activates a Web browsing program (hereinafter, simply referred to as a browser) of the client computer 112 which is used by the reception contractor 111.

The client computer 112 of the reception contractor 111 who will make a reception contract from now on accesses a URL of a site for the reception contract of the TPNC server 101 by using the browser.

The TPNC server 101 detects the access to the URL.

In step S402, the TPNC server 101 transmits form data for registration of a new reception contract to the client computer 112 which is used by the reception contractor 111.

For example, as shown in FIG. 5, the form according to such form data is a format for urging the reception contractor to enter a name, an address, and the like of the reception contractor. FIG. 5 is a schematic diagram of a new registration picture plane which is displayed on a screen of the client computer 112 on the basis of an instruction from the TPNC server 101 shown in FIG. 1.

Data necessary for the registration form, for example, the data such as name, address, and the like of the reception contractor 111 is inputted to the client computer 112 of the reception contractor 111, and the inputted information is transmitted to the TPNC server 101.

In step S403, the TPNC server 101 confirms whether registration data such as name and address which overlap with the reception contractor 111 does not exist in a database of the registered reception contractor in the received data or not.

If the overlapped registration data exists, the TPNC server 101 transmits error information to the client computer 112 in step S410 and the operation is finished.

If the received data is new data, the TPNC server 101 issues a reception contract ID.

The TPNC server 101 transmits a reception contract authentication, that is, data for urging the setting of a password (authentication information) for allowing the reception contractor 111 to access a specific URL of the TPNC server with an access restriction to the client computer 112.

For example, as shown in FIG. 6, the reception contractor 111 enters the password onto a picture plane corresponding to the received form and transmits it to the TPNC server 101. FIG. 6 is a schematic diagram of the entering picture plane of the password for registration confirmation which is transmitted from the client computer 112 shown in FIG. 1 to the TPNC server 101.

In step S404, the TPNC server 101 receives the password of the reception contractor 111.

Subsequently, in step S405, the TPNC server 101 transmits form data for urging the input of contract information regarding news contents whose distribution is desired to the client computer 112 of the reception contractor 111.

As a form to urge the input of the contract information, for example, there are a form for urging the input of data such as setting of the number of distribution paper and connecting form as shown in FIG. 7, a form for urging the input of data such as distributing conditions such as newspaper company and genre whose distribution is desired as shown in FIG. 8, and a form for urging the input of data such as charging/paying conditions, distribution start date, and distributing conditions as shown in FIG. 9.

Each of FIGS. 7, 8, and 9 is a schematic diagram of the entering picture plane of contract information which is displayed on the screen of the client computer 112 on the basis of an instruction from the TPNC server 101 shown in FIG. 1. By using the form as shown in FIG. 8 as mentioned above, the user can set the kinds of contents every plural applying districts. By managing the information which has been inputted via the form as shown in FIG. 8 and transmitted from the user destination, the TPNC server 101 can distribute the contents of the kinds of every plural applying districts of each user. Further, in FIG. 8, it is possible to set detailed parameters such as collecting point (base point), peripheral district range (applying area) for the collecting point, kind of information (genre), and desired reception intensity (reception intensity). In FIG. 9, it is possible to set detailed parameters such as a desired reception start date (distribution start date in FIG. 9) and the like. The TPNC server 101 which manages the set information can execute the distribution of the contents according to the desire of the user as much as possible. Although the form such that the distribution start date is set has been described in the setting form of FIG. 9, a form such that a distribution end date is also set is also presumed in the invention.

The reception contractor 111 describes desired distributing conditions, distributing method, and the like to the received form and transmits them to the TPNC server 101 (step S405).

Subsequently, in step S406, the TPNC server 101 extracts items regarding an advertisement option in the data such as distributing conditions and the like received from the reception contractor 111.

If an option of a layout with an advertisement is selected, the TPNC server 101 transmits form data for obtaining questionnaire information regarding the advertisement to the client computer 112 in step S407.

If the option of the layout with the advertisement is selected, the reception contractor 111 describes receiving conditions or the like for advertisement layout to the form data which has been transmitted from the TPNC server 101 and is used to describe, for example, the questionnaire regarding the advertisement as shown in FIG. 10 and transmits the resultant form data to the TPNC server 101. FIG. 10 is a schematic diagram of an information entering picture plane of the receiving conditions or the like for the advertisement layout which is displayed on the screen of the client computer 112 on the basis of an instruction from the TPNC server 101 shown in FIG. 1.

"base point" shown in FIG. 10 becomes an advertisement base point designated by the client serving as a component element of the invention. Similarly, "applying district (applying area)" corresponds to an advertisement receiving range and "genre" corresponds to the kind. As mentioned above, with respect to the advertisement, the kinds of contents can be set every plural applying districts. In FIG. 10, detailed parameters such as collecting point (base point), peripheral district range (applying area) for the collecting point, kind (genre) of information, desired reception intensity (reception intensity), and the like can be set. The TPNC server 101 which manages the set information can distribute the contents which meet a demand of the user as much as possible to the terminal apparatus which is used by the user.

The TPNC server 101 receives the receiving conditions which were transmitted from the reception contractor 111 and are used for advertisement layout.

The TPNC server 101 stores the received receiving conditions into the database as advertisement information regarding the reception contractor 111. The database can be constructed by the auxiliary storing apparatus 205 such as a hard disk or the like of the TPNC server 101 or can be also constructed by a database server connected to the TPNC server 101. Article information is also stored into the database.

The distribution contract information which is stored by the TPNC server 101 shown in FIG. 1 and concerned with the reception contractor 111 is shown in FIGS. 11A, 11B, 12A and 12B.

Representation data, a user ID, the set number of distribution paper, and the like of each user have been written in FIGS. 11A and 11B.

In FIGS. 11A and 11B, although an address denotes a place where the user lives, this address can be also set to a place where the client computer 112 exists. This is because the address of the user and the place where the client computer 112 exists coincide. For example, like a display state as shown in FIG. 8, if "home" is set in the setting of "base point", the address of the home is set into "base point" in FIGS. 11A and 11B. In FIG. 8, for example, it is assumed that if the home (a workplace, shopping, or the like other than the home is presumed) is set, it is not used only to specify the address but is also used for the TPNC server 101 to specify an application location. Since a detailed explanation will be made hereinlater in FIG. 16, it is omitted here.

Information of the advertisement options and the base points, applying districts, and the like regarding the advertisement information have been written in FIGS. 12A and 12B.

Subsequently, in step S408 in FIG. 4, the TPNC server 101 forms an E-mail account only for use by the reception contractor 111 into the TPNC server 101.

The TPNC server 101 transmits information of the E-mail account to the reception contractor 111.

Further, the TPNC server 101 transmits an automatic receiving program for transferring E-mail to the client computer 112 of the reception contractor 111 to the reception contractor 111 on the basis of the E-mail account.

Subsequently, in step S409, the TPNC server 101 transmits the E-mail to the news server side on the basis of the distribution information shown in FIGS. 11A and 11B and reception setting shown in FIGS. 12A and 12B.

For example, the TPNC server 101 transmits the E-mail to a distribution administrator or a distribution management system of the news server 121 which is managed by A newspaper company on the basis of the distribution information shown in FIGS. 11A and 11B and reception setting shown in FIGS. 12A and 12B.

The E-mail in this example is an E-mail for urging the setting to distribute an article in which the applying district is "WorldWide" and the genre is "politics" to the TPNC server 101 at 3:00 a.m.

Similarly, the TPNC server 101 transmits E-mail for urging each of the news server 122 which is managed by a B newspaper company, the news server 123 which is managed by a C newspaper company, the news server 124 which is managed by a D newspaper company, the news server 125 which is managed by an E newspaper company, and the news server 126 which is managed by an F newspaper company to distribute the articles to an administrator of each news server or the distribution management system.

The distribution administrator of, for example, the news server 121 or the distribution management system which received the E-mail for urging the distribution setting checks an overlap of distributing condition lists which are distributed to the TPNC server 101. If the applying area or the genre is a new distribution item, it is added to the article distributing conditions to the TPNC server 101.

Although not shown here, the number of distribution information shown in FIGS. 11A and 11B is not limited to one for one newspaper company, but there is also a case where a plurality of distribution information is provided for one newspaper company.

In this case, E-mail for urging each newspaper company to distribute the articles under all conditions is transmitted to the administrator of each news server or the distribution management system.

Subsequently, the operation which is executed by the TPNC server 101 in the electronic newspaper system with the advertisement shown in FIG. 1 in order to receive and store the articles and advertisements distributed from each news server will be described with reference to FIG. 13. It is assumed that, among the processes in a flowchart shown in FIG. 13, the operation which is processed by the TPNC server 101 is realized by a method whereby the CPU 201 of the TPNC server 101 reads out a program stored in the non-volatile memory and executes it.

The foregoing articles and advertisements are the articles distributed from the news servers 121 to 126 and the advertisements distributed from the advertisement servers 131 to 133.

FIG. 13 is the flowchart for the operation which is executed by the TPNC server 101 in the electronic newspaper system with the advertisement shown in FIG. 1 in order to receive and store the articles distributed from the news servers 121 to 126 and the advertisements distributed from the advertisement servers 131 to 133.

First, in step S1301, the news servers 121 to 126 transmit the articles to the TPNC server 101 on the basis of an article distributing request transmitted from the TPNC server 101.

For example, the article which is transmitted from the news server 121 is article data which will be transmitted at 3:00 a.m. and in which the applying area (applying district) is "WorldWide" and the genre is "politics".

The above article is transmitted to the TPNC server 101, for example, by E-mail in accordance with a form shown in FIG. 14. FIG. 14 is a schematic diagram of data of the article which is transmitted from the news server 121 shown in FIG. 1 to the TPNC server 101. "distribution intensity" shown in FIG. 14 is information added every contents. The TPNC server 101 discriminates whether the contents is distributed or not by checking whether the distribution intensity set here coincides with the distribution intensity set via FIG. 8 or FIG. 10.

In a manner similar to the news server 121, the article data is also transmitted from each of the news servers 122 to 126 to the TPNC server 101 by Email.

The TPNC server 101 receives the articles transmitted from the news servers.

In step S1302, the TPNC server 101 checks the E-mail of the article data transmitted from the news servers at a predetermined time, for example, at 4:00 a.m. and stores all of the article data into the article database.

For example, the TPNC server 101 stores the article data in the form shown in FIG. 14 into the article database in accordance with a form shown in FIG. 15. FIG. 15 is a conceptual diagram in the case where the TPNC server 101 shown in FIG. 1 stores the article data.

Subsequently, the TPNC server 101 receives the advertisement data in step S1303.

First, the advertisement servers 131 to 133 transmit updating information to the TPNC server 101 on the basis of an advertisement distributing request transmitted from the TPNC server 101.

For example, the advertisement server 131 transmits the updating information to the TPNC server 101 at 3:00 a.m. in accordance with a form shown in FIG. 16. FIG. 16 is a schematic diagram of the data of the updating information which is transmitted from the advertisement server 131 shown in FIG. 1 to the TPNC server 101.

With respect to the updating information, if advertisement information to be updated does not exist, E-mail in a format such that only an updating flag is not updated (corresponding to No against Yes in FIG. 16) is transmitted to the TPNC server 101, and if the advertisement information to be updated exists, the updating information is transmitted to the TPNC server 101 by E-mail.

The TPNC server 101 checks the E-mail of the advertisement data transmitted from the advertisement server at a predetermined time, for example, at 4:00 a.m.

"base point address of reception contractor" shown in FIG. 16 will be explained more in detail. It indicates the set information for allowing the advertiser to set a desired applying location where he wants to distribute and designates for what kind of application the location is used, for example, a home or a company.

That is, assuming that the desired district where the advertisement of the advertiser is distributed is set to "Tokyo oo ku" in FIG. 16, the distribution is desired in the case where the desired district is the location which is used for application of home, company, or shopping (sales shop) and is "Tokyo oo ku".

The information of "home", "company", or "shopping" corresponds to the setting of "base point" in FIG. 8 (home in FIG. 8). That is, if "home" is set by the setting of "base point" in FIG. 8, the TPNC server which manages the set information can manage the address (location) and the application of the location on the basis of the set information of "home". By comparing the managed information with the set information of the contents set via FIG. 16, the kind of contents to be distributed can be specified. The specified contents can be distributed to the customer.

The TPNC server 101 subsequently discriminates whether the advertisement data to be updated exists or not in step S1304.

If the data to be updated exists, the TPNC server 101 stores all advertisement data to be updated into the advertisement database in step S1305.

For example, the TPNC server 101 stores advertisement data in a form shown in FIG. 16 into the database by using an advertiser number in an advertiser database shown in FIG. 17 in accordance with a form shown in FIG. 18. FIG. 17 is a conceptual diagram of data of the advertiser which is stored into the database of the TPNC server 101 shown in FIG. 1. FIG. 18 is a schematic diagram of a storing format of the advertisement data in the TPNC server 101 shown in FIG. 1 into a database.

Figure 19:
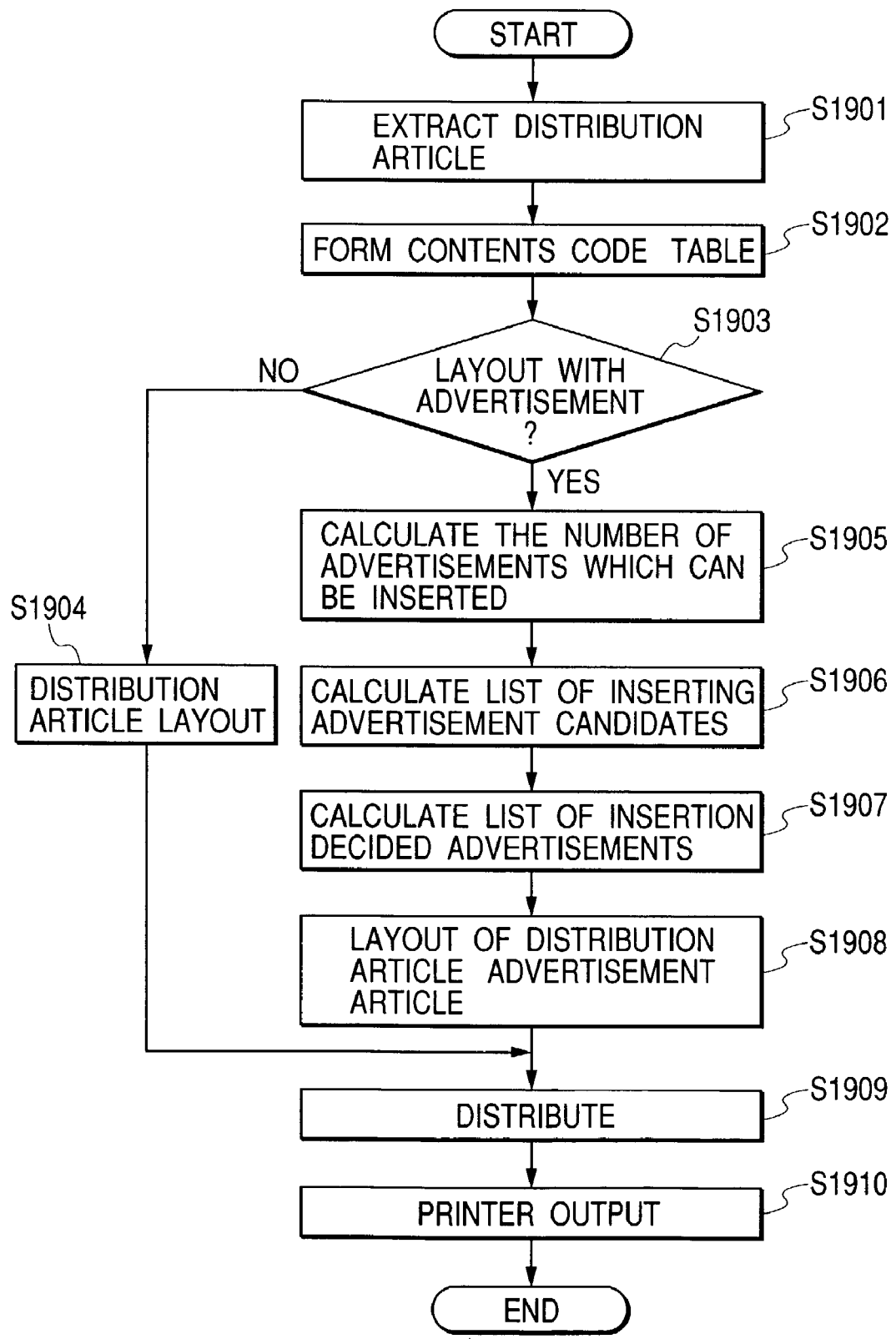
FIG. 19 is a flowchart for the operation which is executed in the case where the TPNC server 101 shown in FIG. 1 performs distribution of an article based on contract contents of the reception contractor 111 to the client computer 112 of the reception contractor 111.

Subsequently, the operation which is executed in the case where the TPNC server 101 shown in FIG. 1 performs distribution of the article based on contract contents of the reception contractor 111 to the client computer 112 of the reception contractor 111 will be described with reference to FIG. 19. FIG. 19 is a flowchart for the operation which is executed in the case where the TPNC server 101 shown in FIG. 1 performs distribution of the article based on the contract contents of the reception contractor 111 to the client computer 112 of the reception contractor 111. Among processes of the flowchart shown in FIG. 19, the operation which is processed by the TPNC server 101 is executed by the CPU 201 of the TPNC server 101 in cooperation with a program.

In step S1901, the TPNC server 101 extracts articles (information) to be distributed from the article database on the basis of the distribution information of the reception contractor 111 in accordance with predetermined conditions.

As predetermined conditions mentioned above, for example, an information distributor preliminarily sets a distribution base point and a desired distribution district range of its peripheral range and the reception contractor 111 on the client computer 112 side also sets a collecting point and a peripheral district range at this point. A condition "the collecting point set by the reception contractor is included in the desired distribution district range" and/or a condition "the address of the distribution base point is included in the peripheral district range of the collecting point set by the reception contractor" can be mentioned.

Figure 35:
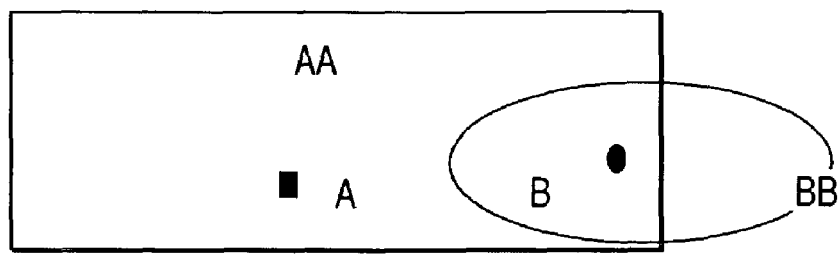
FIG. 35 is a conceptual diagram in the case where the TPNC server 101 in the electronic newspaper system with the advertisement shown in FIG. 1 extracts articles (information) which are distributed from an article database in accordance with predetermined conditions on the basis of distribution information of the reception contractor 111.
Figure 36:
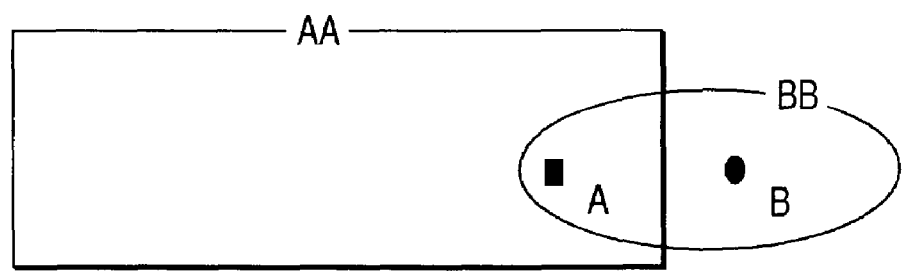
FIG. 36 is a conceptual diagram in the case where the TPNC server 101 in the electronic newspaper system with the advertisement shown in FIG. 1 extracts articles (information) which are distributed from the article database in accordance with predetermined conditions on the basis of distribution information of the reception contractor 111.

"The case where the collecting point set by the reception contractor is included in the desired distribution district range" and "the case where the address of the distribution base point is included in the peripheral district range of the collecting point set by the reception contractor" denote the following cases. A concept in the case where the TPNC server 101 in the electronic newspaper system with the advertisement shown in FIG. 1 extracts articles (information) which are distributed from the article database in accordance with predetermined conditions on the basis of the distribution information of the reception contractor 111 will now be described with reference to FIGS. 35 and 36. FIGS. 35 and 36 are conceptual diagrams in the case where the TPNC server 101 in the electronic newspaper system with the advertisement shown in FIG. 1 extracts articles (information) which are distributed from the article database in accordance with predetermined conditions on the basis of the distribution information of the reception contractor 111.

As shown in FIG. 35,
1. The second distributor (advertiser) sets a base point A (ex. oo cho 1-chome, shop) of a desired distribution district range.
2. The second distributor sets a desired distribution district range AA (ex. within ox shi).

Further, as shown in FIG. 35,
3. The reception contractor sets a collecting point B (ex. his own address, workplace, exchange station on the way of commutation).
4. a. A peripheral range BB (ex. within oo cho) of the collecting point B is automatically set on the basis of predetermined conditions.
or b. The peripheral range BB of the collecting point B is set by the input of the reception contractor.

After the above conditions are set,
(i) "The case where the collecting point set by the reception contractor is included in the desired distribution district range" is assumed to be a case where the collecting point B is included in the range AA as shown in FIG. 35.
(ii) "The case where the address of the distribution base point is included in the peripheral district range of the collecting point set by the reception contractor" is assumed to be a case where the base point A is included in the range BB as shown in FIG. 36.

Figure 37:
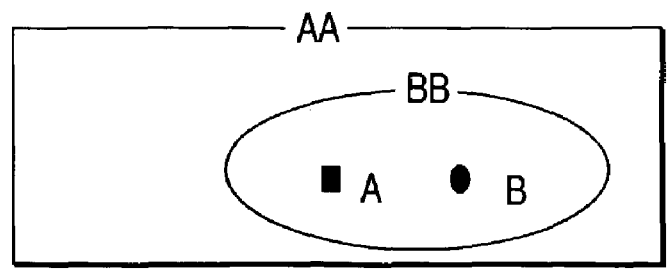
FIG. 37 is a conceptual diagram in the case where the TPNC server 101 in the electronic newspaper system with the advertisement shown in FIG. 1 extracts articles (information) which are distributed from the article database in accordance with predetermined conditions on the basis of distribution information of the reception contractor 111.

A case where both of "the case where the collecting point set by the reception contractor is included in the desired distribution district range" and "the case where the address of the distribution base point is included in the peripheral district range of the collecting point set by the reception contractor" are satisfied is assumed to be a case where the collecting point B is included in the range AA and the base point A is included in the range BB as shown in FIG. 37.

For example, "applying area" shown in FIGS. 11A and 11B corresponds to information regarding the distributing district (desired distribution district range).

As a predetermined condition mentioned above, for example, a condition such that the kind of reception information set in the client computer 112 coincides with the kind of information set in the information stored in the TPNC server 101 or a condition such that the kind of information which is transmitted is included in the kind of reception information can be set.

As a kind of information set in the information stored in the TPNC server 101, for example, "genre" shown in FIGS. 11A and 11B corresponds to it. Although, for example, politics, economics, society, life, lodging, and baseball have been mentioned in this "genre", other kinds (genre) can be also included.

The case where the kind of information which is transmitted is included in the kind of reception information denotes a case where an order of the kind of information which is received is higher than that of the kind of information which is transmitted like a situation that when the information which is received is "politics", the information which is transmitted is "prime minister".

As a predetermined condition mentioned above, for example, a condition such that the reception timing of the reception information set in the client computer 112 coincides with the transmission timing (also referred to as distribution timing) of the information set in the information stored in the TPNC server 101 or a condition such that the transmission timing of the information is included in the reception timing of the information which is received can be set.

The case where the transmission timing is included in the reception timing of the information which is received denotes a case where an order of the time and date of the information which is received is higher than that of the information which is transmitted like a situation that when the date/time of the information which is received is January, the date/time of the information which is transmitted is January 1st.

A unit of the reception timing and the transmission timing can be set to one of second, minute, hour, day, day of the week, week, month, and year.

The distribution timing of the information set in the information stored in the TPNC server 101 is not shown in FIGS. 11A and 11B. However, distribution date/time regarding the advertisement information have been written in FIGS. 12A and 12B and date/time similar to the distribution date/time can be used as distribution date/time of the information stored in the TPNC server 101.

As a predetermined condition mentioned above, for example, a condition such that the reception intensity of the reception information set in the client computer 112 is equal to or larger than the distribution intensity of the information set in the information stored in the TPNC server 101 can be set.

As reception intensity of the information set in the information stored in the TPNC server 101, for example, "reception intensity" shown in FIGS. 11A and 11B corresponds to it. For example, there are "high", "middle", and "low" as levels of the reception intensity. If the reception intensity is shown by a numerical value, it can be set in a manner such that the higher the intensity is, the larger the numerical value is. For example, there are likewise "high", "middle", and "low" as levels of "distribution intensity". If the distribution intensity is shown by a numerical value, on the contrary, it can be set in a manner such that the higher the intensity is, the smaller the numerical value is.

By setting those intensities as mentioned above, when it is assumed that the reception intensity is set to x and the distribution intensity is set to y, the information which is actually received can be expressed so that the reception intensity x satisfies a relation (x≧y). Naturally, each intensity is not limited to the classification of three levels but can be also classified into another arbitrary number of levels.

Subsequently, in step S1902, the TPNC server 101 allocates the number (1 to n) (custom contents code) that is unique to the reception contractor 111 to each of the first to nth articles among the n extracted articles. The custom contents code is managed by the TPNC server 101 by a data address which is unique to the reception contractor and with which one of a reception contractor code, distribution date/time, and contents number has arbitrarily been combined.

An original contents code in the invention is a unique code which is allocated every contents which the contents distributor distributes to the TPNC server 101 and is managed by the TPNC server 101.

The custom contents code is a code which is issued by the TPNC server 101, includes the original contents code, includes one or more of a reception contractor code and reception date/time, and is managed by the TPNC server 101 by the data address. The custom contents code is used for the purpose of enabling the reception contractor to easily search the articles. For example, a character such as an alphabet or a symbol can be used as a custom contents code and it is not limited to a numeral. By managing it as mentioned above, as will be explained hereinlater, for example, if the reception contractor wants to know details of contents information printed onto paper or the like by a printer, detailed information can be easily extracted from a Web or the like.

When explanation is returned to an article extracting flow, the TPNC server 101 stores the allocated numbers (1 to n) as custom contents codes into article number conversion table logs of the reception contractor 111 in a reception contractor information database.

The TPNC server 101 allocates and stores the original contents codes of the articles corresponding to the allocated custom contents codes to the article number conversion table logs of the reception contractor 111 in a reception contractor information database.

FIG. 20 is a conversion table of the allocated custom contents codes and original contents codes which is used in the electronic newspaper system with the advertisement shown in FIG. 1.

This conversion table is formed every reception contractor and held as distribution log information. According to this conversion table, for example, the article of a custom contents code 1 is allowed to correspond to the original contents code 00-20000702-000103-0001.

When a preset time comes (for example, 3:00 a.m. everyday), the TPNC server 101 searches data addresses issued within a preset time interval (for example, after 3:00 a.m. on the previous day) and executes the conversion of the managed custom contents codes. For example, the custom contents codes allocated to "1 to n" on Jul. 1, 2000, are converted into "20000701001 to 20000701n" at 3:00 a.m. on Jul. 2, 2000. The custom contents codes "1 to n" are newly allocated to the latest article distributed after at 3:00 a.m. on Jul. 2, 2000. By performing the conversion as mentioned above, the reception contractor can easily search the latest article and, at the same time, also search the back numbers.

Subsequently, in step S1903, discriminates whether the layout is a layout with an advertisement or not.

In case of the layout without an advertisement, in step S1904, the TPNC server 101 layout-arranges the custom contents codes allocated in step S1902 and the extracted article data corresponding to the custom contents codes on the basis of the contract information of the reception contractor 111.

A layout method is not an essential matter of the present invention. However, for example, the technique disclosed in the embodiment of "Electronic newspaper displaying apparatus and electronic newspaper distributing system" disclosed in JP-A-09-062688 can be used as a layout method.

In step S1903, if the advertisement option is selected, the TPNC server 101 obtains the number of advertisements which can be distributed on the basis of an advertisement layout ratio and the number of distribution paper in step S1905.

Subsequently, in step S1906, the TPNC server 101 discriminates whether each advertisement meets predetermined conditions (predetermined conditions in case of extracting the advertisement information serving as component elements of the invention) or not with respect to all advertisements in the advertisement database, thereby forming a list of inserting advertisement candidates.

That is, a case where advertisement data which meets all of the following eight conditions is extracted and the advertisement numbers and distribution intensities are stored into the distribution candidate list in order to hold the extracted advertisements can be mentioned as an example.

[Condition 1]
The address of the base point of the reception contractor 111 (advertisement base point designated by the client) is included in a desired distribution area (advertisement transmitting range) of the advertiser.

[Condition 2]
The address of the base point of the advertiser (predetermined advertisement base point) is included in a desired distributing area (advertisement receiving range) of the reception contractor 111.

[Condition 3]
A desired genre (kind of advertisement information) of the reception contractor 111 coincides with or is included in an advertisement genre (kind set into the advertisement information) of the advertiser.

[Condition 4]
Attributes of the base point (attributes of the advertisement base point designated by the client) coincide with or are included in attributes of the distribution base point (attributes set into the advertisement information) of the advertiser.

[Condition 5]
The reception intensity of the reception contractor 111 is equal to or larger than the distribution intensity of the advertiser.

[Condition 6]
The distribution date/time (reception timing of the advertisement information) of the reception contractor 111 coincides with or is included in the distribution date/time (transmission timing of the advertisement information) of the advertiser.

[Condition 7]

User attributes (attributes of the user) of the reception contractor 111 coincide with or are included in attributes of the distribution target user (attributes of the advertisement information set by the server) of the advertiser.

[Condition 8]

The number of present distribution advertisements+1 is equal to or less than the number of advertisement distribution target customers.

Although the case where the advertisement information which meets all of the above conditions are extracted has been presumed in the above description, the invention is not limited to such a case. For example, several ones of the above conditions can be arbitrarily selected and combined and such a combination can be used as predetermined conditions. A color priority, which will be explained hereinlater, can be also added as a condition.

The case where the base point attributes of the reception contractor 111 are included in the distribution base point attributes of the advertiser denotes a case where, for example, a concept of the base point attributes of the reception contractor 111 is lower than that of the distribution base point attributes of the advertiser like a situation such that when the base point attributes of the reception contractor indicate amusement grounds, the distribution base point attributes of the advertiser indicate a holiday resort.

The case where the distribution date/time of the reception contractor 111 is included in the distribution date/time of the advertiser denotes a case where, for example, an order of the time and date of the information which is received is lower than that of the information which is transmitted like a situation such that when the reception timing of the reception contractor 111 is January 1st, the transmission timing of the advertiser is January.

The case where the user attributes of the reception contractor 111 are included in the distribution target user attributes of the advertiser contains a case where, for example, the age of 30 years old is set as user attributes of the reception contractor 111 and the age of 25 to 35 years old is set as distribution target user attributes of the advertiser. For example, age, sex, birthplace, occupation, academic background, and the like can be mentioned as user attributes of the reception contractor 111 and as distribution target user attributes of the advertiser.

The concepts of [Condition 1] and [Condition 2] are shown in FIG. 22 and the concept of [Condition 5] is shown in FIG. 21.

FIGS. 21 and 22 are conceptual diagrams of the conditions which are set when advertisement data is extracted in the electronic newspaper system with the advertisement shown in FIG. 1. In FIG. 22, an asterisk (*) indicates the address of the base point of the reception contractor or the address of the base point of the advertiser.

At this time, if each condition has been set to "ALL", this condition is skipped.

It is also possible to set a priority of the desired distribution area of the advertiser to be higher than that of the desired distribution area of the reception reader. In this case, the condition of [Condition 2] is skipped.

With respect to advertisement, there are a case where the advertiser wants to distribute the advertisement to many persons even if the ad rates are large and a case where the advertiser wants to narrow down the targets to persons who may be interested in the advertisement and distribute the advertisement to them without expending the large ad rates as much as possible. As a distributing method which enables various cases to be selected in accordance with such a demand of the distributor side and enables the reception reader side to receive the advertisement which is more matched with his taste and interesting, for example, there is a method whereby the advertisement distributor side sets the distribution intensity, the reception reader side sets the reception intensity, and whether the advertisement is distributed or not is determined every advertisement or every reception reader.

The distribution intensity mentioned here denotes an index which is used when the advertiser determines a degree at which the advertiser narrows down the advertisement distribution targets in accordance with the taste, interesting, and the like of the reception reader. When the advertiser wants to distribute the advertisement to the larger number of persons, the distribution intensity increases more. On the contrary, when the advertiser wants to narrow down the targets to the persons who are more interested in the advertisement, the distribution intensity decreases more. The reception intensity denotes an index which is used to determine degrees of the taste and interesting of the reception reader with respect to a certain genre. The larger the taste and interesting are, the higher the reception intensity is. On the contrary, the smaller the taste and interesting are, the lower the reception intensity is.

As shown in FIG. 21 regarding [Condition 5], the "reception intensity" of the advertisement information is classified into, for example, three levels of high, middle, and low. When it is expressed by a numerical value, the higher the intensity is, the larger the numerical value is. On the contrary, the "distribution intensity" is classified into, for example, three levels of high, middle, and low. When it is expressed by a numerical value, the higher the intensity is, the smaller the numerical value is. Naturally, the invention is not limited to such intensity classification of three levels but can be also classified into an arbitrary number of intensity levels.

By setting the conditions by numerical values as mentioned above, when it is assumed that the reception intensity is set to x and the distribution intensity is set to y, the TPNC server 101 determines that the information is received when the reception intensity x satisfies the relation ($x \geq y$), so that this information is added into the distribution list per reception reader. Unless otherwise, it is determined that the information is not received, so that this information is not added into the distribution list.

Returning to the explanation of FIG. 19, in step S1907, when the number of advertisements in the distribution candidate list obtained in step S1906 is smaller than the number of advertisements which can be distributed, the TPNC server 101 determines the distribution candidate list as a distribution list and updates the actual number of customers of the advertisement distribution in the database shown in FIG. 18 of the decided advertisements.

That is, the TPNC server 101 inputs predetermined conditions which are set into the advertisement information and calculates the number of client computers 112 to which the advertisement information is transmitted.

When the number of advertisements in the distribution candidate list obtained in step S1906 is larger than the number of advertisements which can be distributed, the TPNC server 101 determines the numbers of the advertisements as many as the number of advertisements which can be distributed as a distribution list in order from the advertisement in which the desired reception intensity of the reception contractor 111 is high, and updates the actual number of customers of the advertisement distribution in the database of the decided advertisements.

In step S1908, the TPNC server 101 layout-arranges the article data on the basis of the contract information of the reception contractor 111 with respect to the article data extracted together with the custom contents codes allocated in step S1902.

Further, the TPNC server 101 layout-arranges the advertisement data on the basis of the contract information of the reception contractor 111 with respect to the advertisement data extracted on the basis of the distribution list obtained in step S1907.

In step S1909, the TPNC server 101 forms a distribution data file of the data which has been layout-arranged in step S1904 or S1908 and is distributed to the reception contractor 111. The TPNC server 101 arranges the formed distribution data file in a format of an annexed file into a spooler of a dedicated E-mail account of the reception contractor 111 existing in the TPNC server 101.

Figure 23:
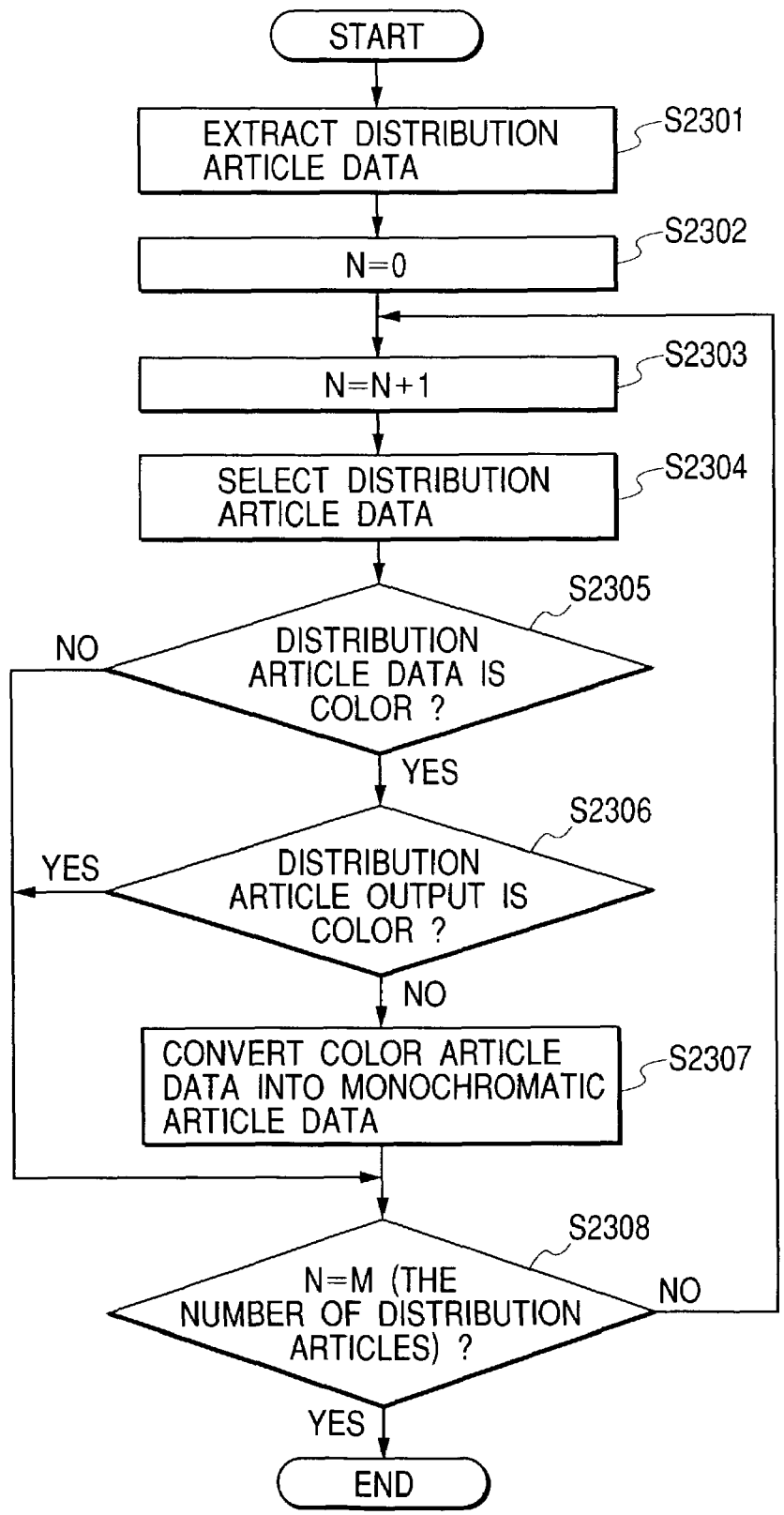
FIG. 23 is a flowchart for the operation which is executed in the case where the TPNC server 101 shown in FIG. 1 determines either the color output or the monochromatic output of distribution data based on the contract contents of the reception contractor 111.

The TPNC server 101 determines either the color output mode or the monochromatic output mode with respect to the formed distribution data file. The operation which is executed in the case where the TPNC server 101 shown in FIG. 1 determines either the color output or the monochromatic output of the distribution data based on the contract contents of the reception contractor 111 will now be described with reference to FIG. 23. FIG. 23 is a flowchart for the operation which is executed in the case where the TPNC server 101 shown in FIG. 1 determines either the color output or the monochromatic output of the distribution data based on the contract contents of the reception contractor 111. Among processing steps of the flowchart shown in FIG. 23, the operation which is processed by the TPNC server 101 is executed by the CPU 201 of the TPNC server 101 in cooperation of a program.

First, in step S2301, the TPNC server 101 extracts the distribution article data in the distribution data file formed in step S1909 in FIG. 19.

Subsequently, in step S2302, the TPNC server 101 sets an integer N to (N=0), in which N corresponds to the custom contents codes of the numbers 1 to n allocated to the distribution article data of Nos. 1 to n uniquely for the reception contractor 111.

Subsequently, in step S2303, the TPNC server 101 adds "1" to the integer N, thereby setting it to N+1.

In step S2304, the TPNC server 101 selects the distribution article data of the custom contents codes corresponding to the integer N set in step S2303.

In step S2305, the TPNC server 101 discriminates whether the distribution article data selected in step S2304 is color or not.

If the distribution article data is not color but monochromatic, the TPNC server 101 advances to step S2308 and discriminates whether the integer N is equal (that is, N=M) to the number M of distribution articles corresponding to the number n of articles to which the custom contents codes have been allocated or not. If N=M, the processing routine is finished as it is. If N is not equal to M, the processing routine is returned to step S2303.

If the color output is selected for the distribution article data selected in step S2305, the TPNC server 101 discriminates whether the condition that of the article distribution of the distribution article data selected in step S2305 is distributed in the color output mode is satisfied or not.

As a condition to determine either the color output or the monochromatic output of the selected distribution article data, for example, it is possible to set a condition that the data is outputted in the color mode if a desired color degree of the reception information which has been set in the client computer 112 is equal to or larger than the color priority of the information which has been set in the distribution article data stored in the TPNC server 101. In this case, if the desired color degree is less than the color priority, the data is outputted in the monochromatic mode.

As a desired color degree of the information which has been set in the information stored in the TPNC server 101, a "desired color degree" which is set in a manner similar to, for example, the reception intensity in FIGS. 11A and 11B as a subscription setting of the reception contractor 111 corresponds to it. The "desired color degree" is classified into, for example, levels of A, B, and C as shown in FIG. 24. If the desired color degree is expressed by a numerical value, it can be set in a manner such that the former the position of alphabetical order is, the larger the numerical value is. On the contrary, the "color priority" which is set every data of the distribution articles 1 to 6 in FIGS. 11A and 11B is classified into, for example, levels of large, normal, and small as shown in FIG. 24. If the color priority is expressed by a numerical value, it can be set in a manner such that the larger the color priority is, the smaller the numerical value is. The "desired color degree" is set by being added to the form of FIG. 8. The "color priority" is preliminarily added to the advertisement data in FIG. 16.

By constructing as mentioned above, assuming that the numerical value of the desired color degree is set to α and the numerical value of the color priority is set to β, the TPNC server 101 can determine that the information which is actually received is outputted in the color mode when the numerical value a of the desired color degree meets a relation a α≧β. Naturally, the invention is not limited to the classification of three levels but they can be also classified into another arbitrary number of levels.

If the conditions of the color output are satisfied as a result of the discrimination in step S2306, step S2308 follows. Whether the integer N is equal (N=M) to the number M of distribution articles corresponding to the number n of articles to which the custom contents codes have been allocated or not is discriminated. If N=M, the processing routine is finished as it is. If N is not equal to M, the processing routine is returned to step S2303.

If the conditions of the color output are not satisfied as a result of the discrimination in step S2306 and the data is outputted in the monochromatic mode, step S2307 follows. The TPNC server 101 converts the color article data into the monochromatic article data. The converted monochromatic distribution article data is registered again into the distribution data file.

After completion of the conversion into the monochromatic data, step S2308 follows. Whether the integer N is equal (N=M) to the number M of distribution articles corresponding to the number n of articles to which the custom contents codes have been allocated or not is discriminated. If N=M, the processing routine is finished as it is. If N is not equal to M, the processing routine is returned to step S2303.

Although the decision about the color/monochromatic output of the distribution data file has been described with respect to the distribution article data, this point is also similarly applied to the advertisement data in the distribution data file. For example, in step S2302 in FIG. 23, the processes in the flowchart of FIG. 23 can be executed by allowing the advertisement data in the order determined in the distribution list to correspond as an integer N. In the embodiment, however, as will be explained hereinlater, with respect to the advertisements, since an amount of money corresponding to the consumption amount of the consumables (toner) consumed by the print output is returned, the color advertisement data is outputted in the color mode in accordance with the demand of the advertiser or so long as the advertising conditions of the reception contractor 111 are satisfied.

The TPNC server 101 arranges the distribution data file determined to be outputted in either the color mode or the monochromatic mode as mentioned above into the spooler of the E-mail account only for use of the reception contractor 111 existing in the TPNC server 101 in the format of the annexed file. Returning to the flowchart shown in FIG. 19, explanation will be made hereinbelow.

In step S1910 in FIG. 19, when a set time, for example, 5:00 a.m. comes, an automatic receiving program installed in a hard disk of the client computer 112 which is used by the reception contractor 111 activates the client computer 112 which is used by the reception contractor 111 and the printer 113.

The automatic receiving program receives the distribution data file, as E-mail, spooled in the Email account only for use of the reception contractor 111 existing in the TPNC server 101.

The automatic receiving program extracts the annexed distribution data file from the received Email and outputs it to the printer 113.

As mentioned above, according to the embodiment, in accordance with the location which has arbitrarily been set by the reception contractor or his taste, the TPNC server 101 can select the articles and advertisements which are distributed, edit them, and transmit them to the reception contractor 111.

Therefore, the reception contractor 111 can obtain the articles and advertisements which are matched with his desire, and the advertiser can give the advertisements to the reception contractor more properly and effectively.

The reception contractor 111 can set either the color output or the monochromatic output of the articles and advertisements in accordance with his desire. A situation such that the distribution data amount and the print costs upon printing are distributed as they are in accordance with the demand of the distributor does not occur.

According to the embodiment, in the case where the distribution contents in which the distribution data of the distribution data file has been layout-arranged every page are print-outputted by the printer 113 connected to the client computer 112, the advertisements are also printed. However, in order to prevent a situation that the print costs of the consumables (the toner is used as an example here: however, the consumables such as toner or the like other than the ink can be also applied) which are consumed in association of the printing of the advertisements become a burden on the reception contractor 111, the return money amount based on the consumption amount of the toner used for printing of the distribution advertisements is calculated and subtracted from the subscription of the reception contractor 111. The return money amount subtracted from the subscription of the reception contractor 111 is requested to the advertiser by the TPNC server 101.

As mentioned above, it is also possible to construct the system in a manner such that the TPNC server 101 does not intervene the return of the return money amount but the information of the return money amount is transmitted from the TPNC server 101 to the advertiser, and the return money amount is directly sent from the advertiser to the reception contractor 111.

Figure 25:
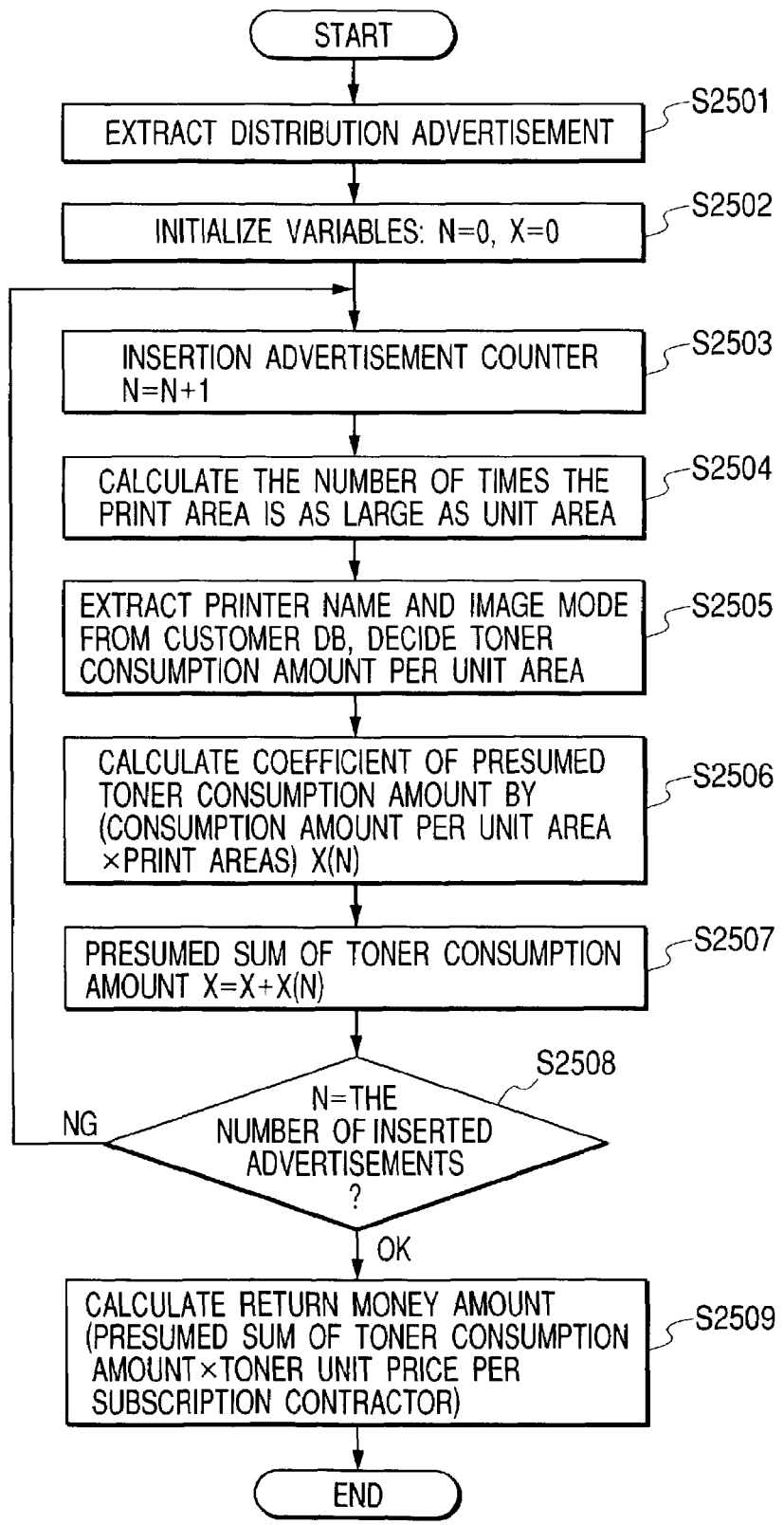
FIG. 25 is a flowchart for the operation which is executed in the case where the TPNC server 101 shown in FIG. 1 executes a calculation of an amount of return money based on a consumption amount of toner which is used for printing of distribution advertisements in a printer 113.

The operation which is executed in the case where the TPNC server 101 shown in FIG. 1 executes a calculation of the amount of return money based on the consumption amount of the toner which is used for printing of the distribution advertisements in the printer 113 in the case where the return money amount is paid back and when the advertisements are print-outputted by the printer connected to the client computer 112 will be described with reference to FIG. 25. FIG. 25 is a flowchart for the operation which is executed in the case where the TPNC server 101 shown in FIG. 1 calculates the amount of return money based on the consumption amount of the toner which is used to print the distribution advertisements by the printer 113.

In step S2501, the TPNC server 101 extracts the distribution advertisements from the distribution data file formed in step S1909 in FIG. 19. The distribution data file which is used here is the distribution data obtained after either the color output or the monochromatic output was determined in accordance with the flowchart of FIG. 23.

Subsequently, in step S2502, a variable of each of the insertion advertisement counter N and a presumed sum X of toner consumption amount is initialized and they are set to N=0 and X=0. The distribution advertisements correspond to the insertion advertisement counter N in order determined in the distribution list.

Subsequently, in step S2503, the TPNC server 101 adds "1" to the insertion advertisement counter N, thereby setting it to N+1.

In step S2504, the TPNC server 101 calculates what number of times the print area obtained after the layout of the distribution advertisements corresponding to the insertion advertisement counter N set in step S2503 is as large as a unit area.

Subsequently, in step S2505, the TPNC server 101 extracts a printer name and an image mode from the distribution contract information shown in FIGS. 11A and 11B in the stored customer database and determines the toner consumption amount per unit area. The toner consumption amount per unit area can be decided if the printer name and the image mode are known by using printer information per kind of printer shown in FIG. 26 which is stored in the TPNC server 101. In FIG. 26, when the printer name is LBP-1000 and the image mode is standard, it will be understood that the toner consumption amount per unit area is equal to a character 2 pico-g and the image data is equal to 20 pico-g.

Subsequently, in step S2506, the TPNC server 101 multiplies the toner consumption amount per unit area determined in step S2505 by the value (which was calculated in step S2504) indicative of the number of times the print area obtained after the layout of the distribution advertisements is as large as the unit area, thereby calculating a value of the presumed sum X(N) of the toner consumption amount.

In the calculation of the value of the presumed sum X(N) of the toner consumption amount, for example, like a technique disclosed in JP-A-07-329404, it can be also obtained by a method whereby the print area obtained after the layout of the distribution advertisements is once developed to a bit map, the number of dots of each color of the toner which is used is counted, and a toner consumption amount per dot is multiplied by the accumulated number of dots.

In step S2507, the TPNC server 101 adds the presumed toner consumption amount X(N) calculated in step S2506 to the presumed sum X of toner consumption amount, thereby setting it to X+X(N).

In step S2508, whether the count value of the insertion advertisement counter N is equal to the number of insertion advertisements extracted from the distribution data file (N=the number of insertion advertisements) or not is discriminated. If N=the number of insertion advertisements, step S2509 follows. If N is not equal to the number of insertion advertisements, the processing routine is returned to step S2503.

In step S2509, the TPNC server 101 calculates the return money amount. The return money amount is calculated by multiplying the presumed sum X of toner consumption amount calculated in step S2507 by a toner unit cost per subscription contractor of the reception contractor 111.

As mentioned above, according to the embodiment, since the return money amount based on the consumption amount of the toner used to print the distribution advertisements is calculated and the return money amount is subtracted from the subscription of the reception contractor 111, a situation that the print costs of the consumables which are consumed due to the printing of the advertisements become a burden on the reception contractor 111 is prevented. One factor which causes the reception contractor to hate to insert his advertisement can be eliminated.

According to the embodiment, when only the distribution contents of the distribution data file are print-outputted by the printer 113, the TPNC server 101 notifies the reception contractor 111 of the exchange timing of the consumable cartridge which is consumed by the printing (since the toner is used as consumables here, the toner cartridge is mentioned here as an example. The invention can be also applied to a cartridge in which other consumables such as an ink cartridge and the like have been enclosed.), thereby urging the contractor to exchange the toner cartridge.

Figure 27:
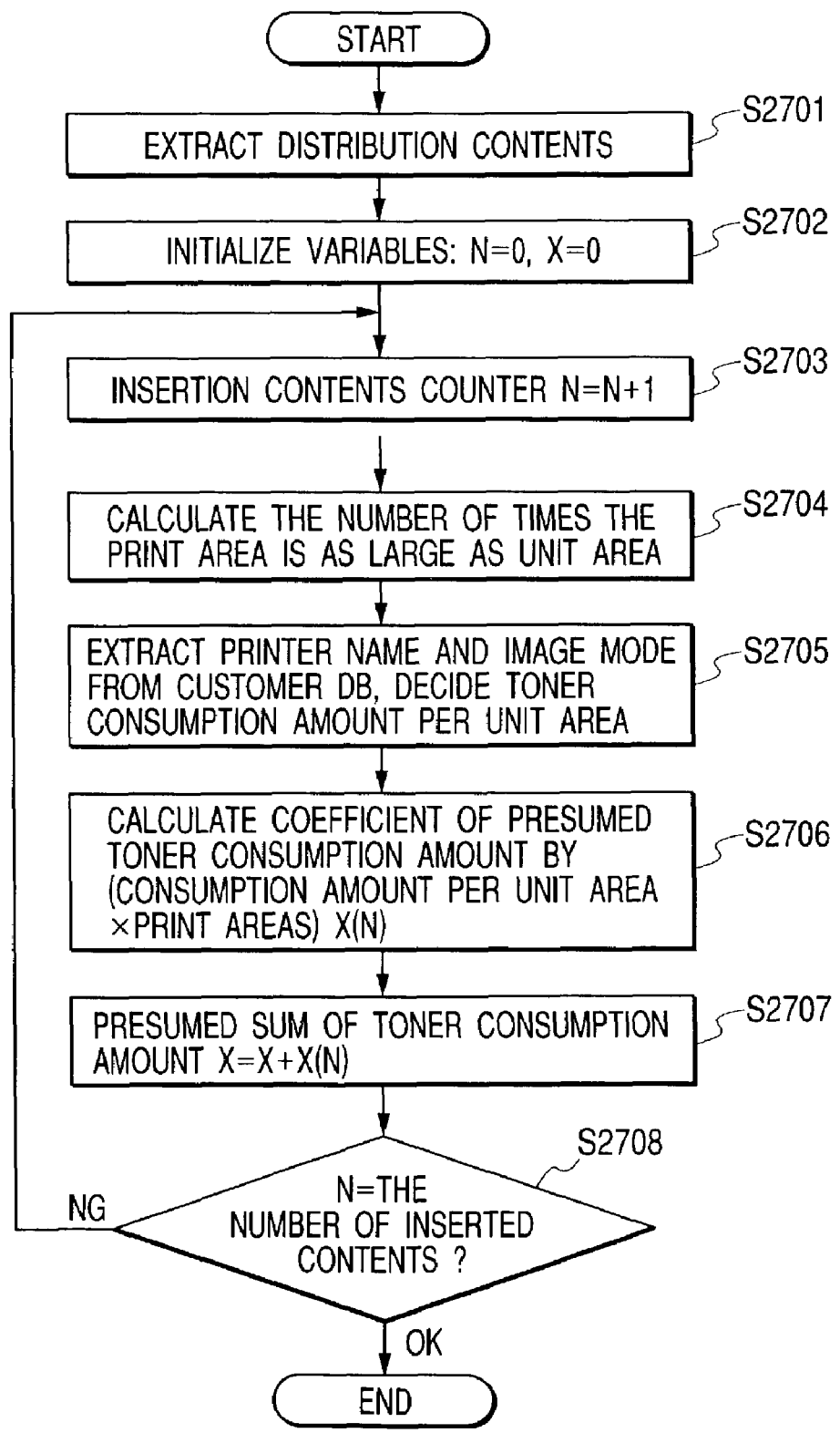
FIG. 27 is a flowchart for the operation which is executed in the case where the TPNC server 101 shown in FIG. 1 executes a calculation of the sum of consumption amount of the toner which is used for printing of a distribution data file per distribution.

The operation which is executed in the case where the TPNC server 101 shown in FIG. 1 executes a calculation of the sum of consumption amount of the toner which is used for printing of the distribution data file per distribution in the case where the exchange of the toner cartridge is urged and the data is print-outputted by the printer 113 connected to the client computer 112 will now be described with reference to FIG. 27. FIG. 27 is a flowchart for the operation which is executed in the case where the TPNC server 101 shown in FIG. 1 calculates the sum of consumption amount of the toner which is used to print the distribution data file per distribution.

In step S2701, the TPNC server 101 extracts the distribution contents of each page in which the articles and advertisements have been layout-arranged from the distribution data file formed in step S1909 in FIG. 19. The distribution data file used here is the distribution data obtained after either the color output or the monochromatic output was determined in accordance with the flowchart of FIG. 23.

Subsequently, in step S2702, the TPNC server 101 initializes the variables of the insertion advertisement counter N and the presumed sum X of toner consumption amount, thereby setting them to N=0 and X=0. The distribution contents correspond to the insertion contents counter N in order of the distribution pages.

Subsequently, in step S2703, the TPNC server 101 adds "1" to the count value of the insertion contents counter N, thereby setting it to N+1.

In step S2704, the TPNC server 101 calculates what number of times the print area obtained after the layout of the distribution contents corresponding to the insertion contents counter N set in step S2703 is as large as the unit area.

Subsequently, in step S2705, the TPNC server 101 extracts the printer name and the image mode from the distribution contract information shown in FIGS. 11A and 11B in the stored customer database and determines the toner consumption amount per unit area. The toner consumption amount per unit area can be decided if the printer name and the image mode are known by using the printer information shown in FIG. 26 which is stored in the TPNC server 101.

Subsequently, in step S2706, the TPNC server 101 multiplies the toner consumption amount per unit area determined in step S2705 by the value (which was calculated in step S2704) indicative of the number of times the print area obtained after the layout of the distribution contents is as large as the unit area, thereby calculating the value of the presumed sum X(N) of the toner consumption amount.

In the calculation of the value of the presumed sum X(N) of the toner consumption amount, for example, like a technique disclosed in JP-A-07-329404, it can be also obtained by a method whereby the print area obtained after the layout of the distribution contents is once developed to a bit map, the number of dots of each color of the toner which is used is counted, and the toner consumption amount per dot is multiplied by the accumulated number of dots.

In step S2707, the TPNC server 101 adds the presumed toner consumption amount X(N) calculated in step S2706 to the presumed sum X of toner consumption amount, thereby setting it to X+X(N).

In step S2708, whether the count value of the insertion contents counter N is equal to the number of insertion contents of the distribution contents extracted from the distribution data file (N the number of insertion contents) or not is discriminated. If N=the number of insertion contents, the presumed sum X of toner consumption amount in this distribution is stored and this processing routine is finished. If N is not equal to the number of insertion contents, the processing routine is returned to step S2703.

Figure 28:
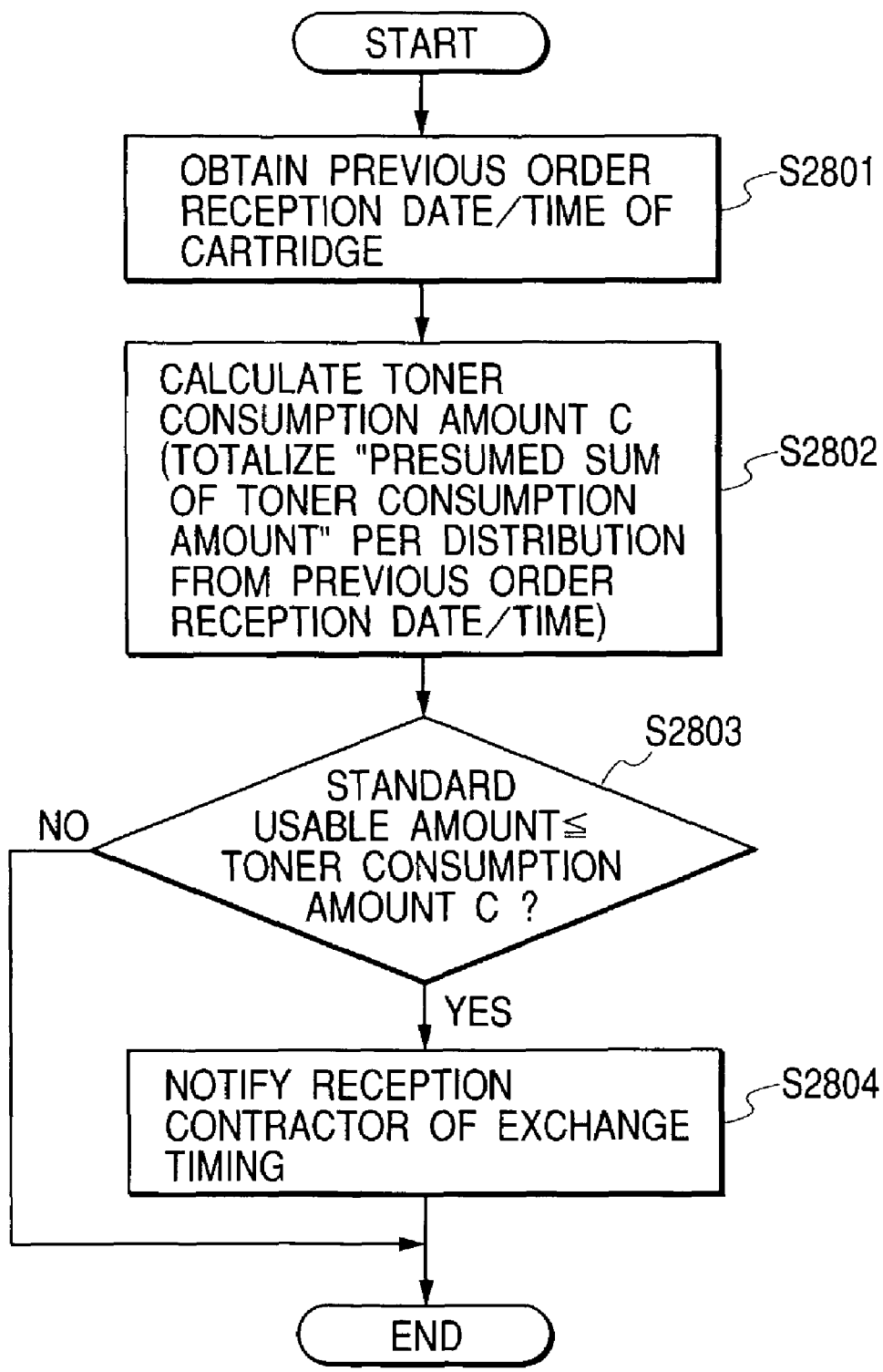
FIG. 28 is a flowchart for the operation which is executed in the case where the TPNC server 101 shown in FIG. 1 notifies timing for exchanging a toner cartridge after a presumed sum X of toner consumption amount was calculated in accordance with the flowchart of FIG. 27.

The operation which is executed in the case where the TPNC server 101 shown in FIG. 1 notifies timing for exchanging the toner cartridge after the presumed sum X of toner consumption amount was calculated when the exchange of the toner cartridge is urged will be described with reference to FIG. 28. FIG. 28 is a flowchart for the operation which is executed in the case where the TPNC server 101 shown in FIG. 1 notifies the timing for exchanging the toner cartridge after the presumed sum X of toner consumption amount was calculated in accordance with the flowchart of FIG. 27.

In step S2801, the TPNC server 101 obtains the previous order reception date/time of the toner cartridge after the presumed sum X of toner consumption amount was calculated. The previous order reception date/time have been registered in toner cartridge information which is stored in the TPNC server 101.

In step S2802, the TPNC server 101 calculates a toner consumption amount C. The toner consumption amount C is calculated by accumulating the presumed sum X of toner consumption amount of each distribution which was calculated in accordance with the flowchart of FIG. 27 from the previous order reception date/time.

In step S2803, the TPNC server 101 discriminates whether the toner consumption amount C is equal to or larger than a standard usable amount of the toner cartridge or not, that is, whether the life of the toner cartridge has reached a standard life or not. The standard usable amount of the toner cartridge has been registered in the toner cartridge information which is stored in the TPNC server 101. For example, in case of the toner cartridge, the standard life used in the embodiment denotes the number of paper which can be outputted in the case where the printer is used in a standard manner by using one cartridge. In case of the paper, the standard life corresponds to the number of sheets of a bundle of paper which is purchased (in many cases, it is equal to 500) or the number of sheets of one paper box which is purchased (in many cases, it is equal to 2500). That is, a time duration which is necessary until the toner is consumed or the paper is consumed, the toner cartridge is exchanged or the paper is supplemented, and the operation to purchase the next toner cartridge or paper is needed.

In step S2803, if the toner consumption amount C is smaller than the standard usable amount, the processing routine is finished as it is.

In step S2803, if the toner consumption amount C is equal to or larger than the standard usable amount, step S2804 follows. The TPNC server 101 notifies the reception contractor 111 of the exchange timing of the toner cartridge. The notification of the exchange timing of the toner cartridge is performed by transmitting the distribution data file to the client computer 112 which is used by the reception contractor 111 and, at the same time, transmitting notifying picture plane data for notifying the toner cartridge exchange timing to the client computer 112.

It is also possible to construct the system in a manner such that only the notification of the exchange timing of the toner cartridge is performed simultaneously with the transmission of the distribution data file and the notifying picture plane data is transmitted after the reception contractor 111 accessed the site for management of contents, contracts, and the like to which the reception contractor 111 of the TPNC server 101 can perform the log-in by the client computer 112.

After the exchange timing of the toner cartridge was notified, the reception contractor 111 can confirm by the client computer 112 that the exchange timing of the toner cartridge is approaching, for example, on the notifying picture plane as shown in FIG. 29A. FIG. 29A is a schematic diagram of the notifying picture plane of the exchange timing of the toner cartridge notified from the TPNC server 101 shown in FIG. 1, and this picture plane is displayed on the screen of the client computer 112.

In the notifying picture plane of the exchange timing of the toner cartridge of FIG. 29A, not only by notifying the exchange timing but also by clicking a "Yes" button 2901 on the picture plane for ordering a new toner cartridge, the screen can be shifted to a picture plane of a delivery form for delivering the exchange toner cartridge. Such delivery form data is included in the notifying picture plane which is transmitted from the TPNC server 101. On the notifying picture plane of the exchange timing of the toner cartridge of FIG. 29A, if a "No" button 2902 is clicked without demanding the order of the toner cartridge, this picture plane is extinguished. However, it is displayed again after the elapse of a predetermined time.

For example, as shown in FIG. 29B, the delivery form has a format for urging the entering of the first and second requests of delivery date/time of the toner cartridge which is purchased by the reception contractor 111. FIG. 29B is a schematic diagram of a delivery form picture plane which is displayed on the screen of the client computer 112 and has been shifted from the notifying picture plane of the exchange timing of the toner cartridge.

The reception contractor 111 enters data necessary for the delivery form of FIG. 29B and the data of the delivery date/time of the first and second requests by the client computer 112 and clicks a "Send" button 2903, thereby transmitting those data to the TPNC server 101.

The TPNC server 101 adjusts a delivery date on the basis of the received data of the delivery date/time of the first and second requests. If the delivery date can be adjusted, the TPNC server 101 transmits data of the delivery date to the client computer 112.

A user interface which can decide and change at the notified delivery date/time is included in the picture plane for displaying the data of the delivery date which is notified to the client. When an "OK" button is pressed, a message showing that the delivery date/time notified to the client are determined is transmitted from the client computer 112 to the TPNC server 101. When a "Change" button is pressed, the screen is returned to the delivery form picture plane of FIG. 29B and the delivery date/time of each of the first and second requests are entered again.

As mentioned above, according to the embodiment, when particularly only the distribution data file is print-outputted by the printer 113, the TPNC server 101 notifies the reception contractor 111 of the exchange timing of the toner cartridge in association with the printing, thereby urging the exchange of the toner cartridge. Therefore, the reception contractor 111 can easily manage the exchange timing of the toner cartridge.

After completion of the notification of the exchange timing of the toner cartridge, a new toner cartridge is ordered to the TPNC server 101 and the delivery date can be also determined. Therefore, the reception contractor 111 can omit a troublesomeness such that he goes to buy it or orders it by a telephone or the Internet in order to exchange the toner cartridge.

In the embodiment, by using the custom contents codes which are allocated after the output of the distribution contents, the reception contractor 111 can more easily refer to (receive) the detailed articles or the information of the related articles.

Figure 30:
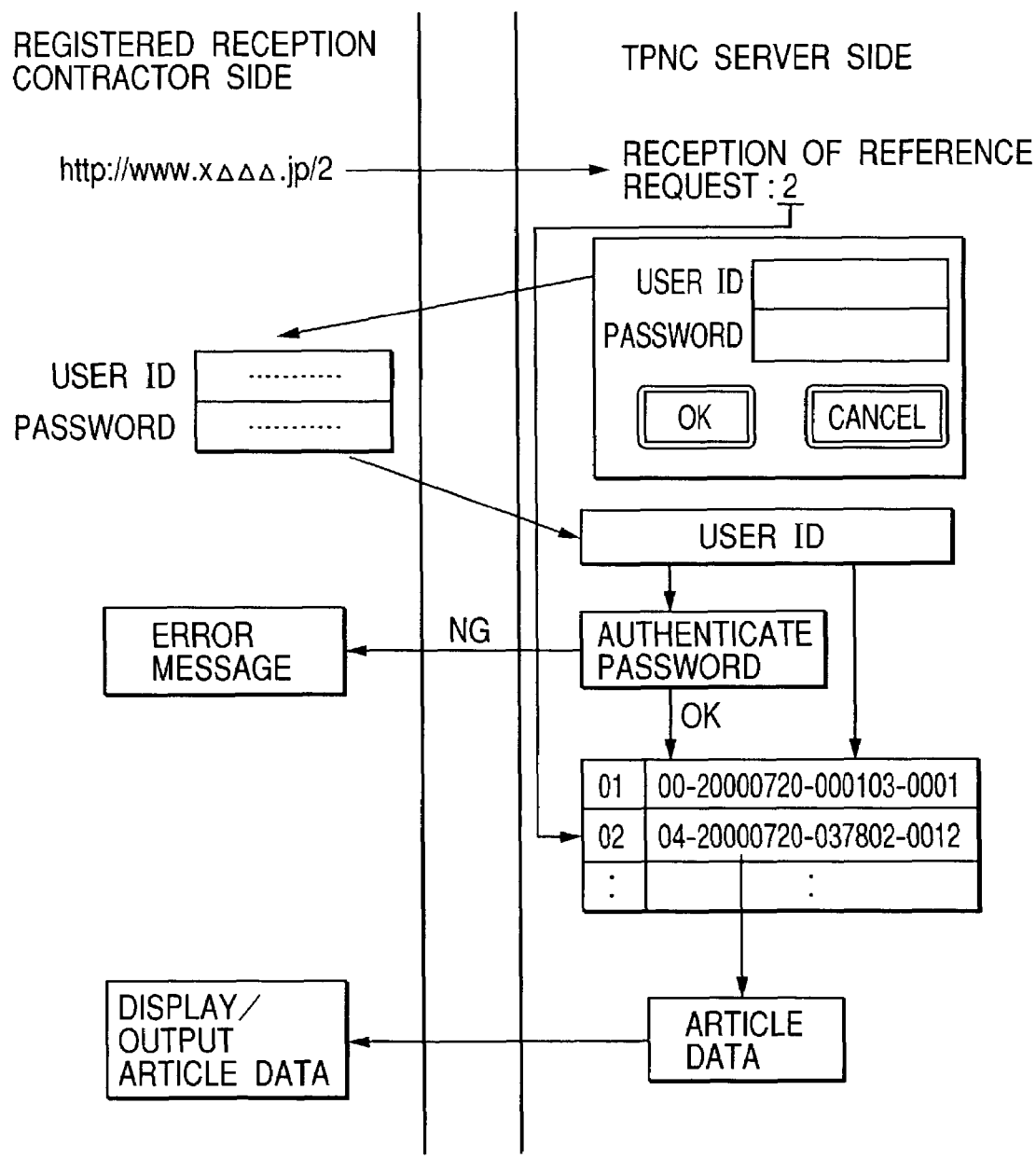
FIG. 30 is a flowchart for the operation for referring to detailed articles by using the custom contents codes.

The operation for referring to the detailed articles by using the custom contents codes will be described with reference to FIG. 30. FIG. 30 is a flowchart for the operation for referring to detailed articles by using the custom contents codes in the electronic newspaper system with the advertisement according to the invention. Among the processes in the flowchart shown in FIG. 30, the operation which is processed by the TPNC server 101 is executed by the CPU 201 of the TPNC server 101 in cooperation with a program.

When a predetermined URL (Uniform Resource Locator) as an address of the site of the server is received from the client computer 112 of the reception contractor 111, the TPNC server 101 transmits data for urging the entering of the user ID and his password to the reception contractor 111.

As such a predetermined URL, for example, there are a URL only for use of referring to the article from the reception contractor 111 and a URL in which a character string of the custom contents code has been added to the end.

As examples of such URLs, the URL only for use of referring to the article is expressed by http://www.×△△△.jp/ and there is a URL having a form of http://www.×△△△.jp/2 if the custom contents code of the referring article is equal to 2.

The predetermined URL as mentioned above is formed by the client computer 112.

That is, when the reception contractor enters the custom contents code (for example, 2), the client computer 112 forms the URL only for use of referring to the article (for example, http://www.×ΔΔΔ.jp/2).

A browser of the client computer 112 accesses the file of the TPNC server 101 which is instructed by the formed URL.

Therefore, there is no need to enter the URL generally comprising tens of characters, and the reception contractor 111 can access a desired site merely entering the custom contents code.

Subsequently, as a user authenticating operation, the TPNC server 101 receives the user ID and password from the reception contractor 111 (authentication of the user).

The TPNC server 101 collates them with the database of the registered reception contractor 111.

In case of the illegal reception data, the TPNC server 101 finishes the operation.

In case of the legal reception data, the TPNC server 101 obtains the custom contents code from the URL in which the custom contents code has been added to the end. In this case, it is equal to 2.

The TPNC server 101 extracts the latest distributed and outputted article history among the items of the reception contractor 111 from the database of the registered reception contractor 111 on the basis of the user ID and the custom contents code (2).

That is, since the original contents code corresponding to the custom contents code is unconditionally determined every reception contractor 111, the reception contractor 111 can extract the original contents code by using the custom contents code.

The TPNC server 101 transmits the data of the original contents data corresponding to the custom contents code in the article history to the reception contractor 111.

As mentioned above, the reception contractor 111 can easily access by the detailed articles of a desired article by using the custom contents code.

In the embodiment described above, a relation among the articles does not exist among the articles which have been distributed from the news server and stored in the TPNC server 101.

However, if there is a relation with the articles distributed in the past, the related distribution data can also have an article data format disclosed in the article data.

An example in which if there is a relation with the articles distributed in the past, the related distribution data can also have the article data format disclosed in the article data will now be described.

For example, as shown in FIG. 31, the article data format to which the items regarding the related articles have been added is distributed from the news server to the TPNC server 101. FIG. 31 is a conceptual diagram of the article data format to which the items regarding the related articles have been added and which is distributed from the news server to the TPNC server 101 in the first embodiment of the electronic newspaper system with the advertisement according to the invention.

In the diagram, the number of related articles 3201 corresponding to a distributing source No. 121, information 3202 of the first related article, and information 3203 of the second related article are described. Naturally, the number of related articles is not limited to 2 as shown in FIG. 31 but can be set to another arbitrary number.

The TPNC server 101 constructs an article in a format in which the items regarding the distributed related articles have been added into the database.

The TPNC server 101 distributes the article data also including the items regarding the related articles to the reception contractor 111.

Figures 32A, 32B:
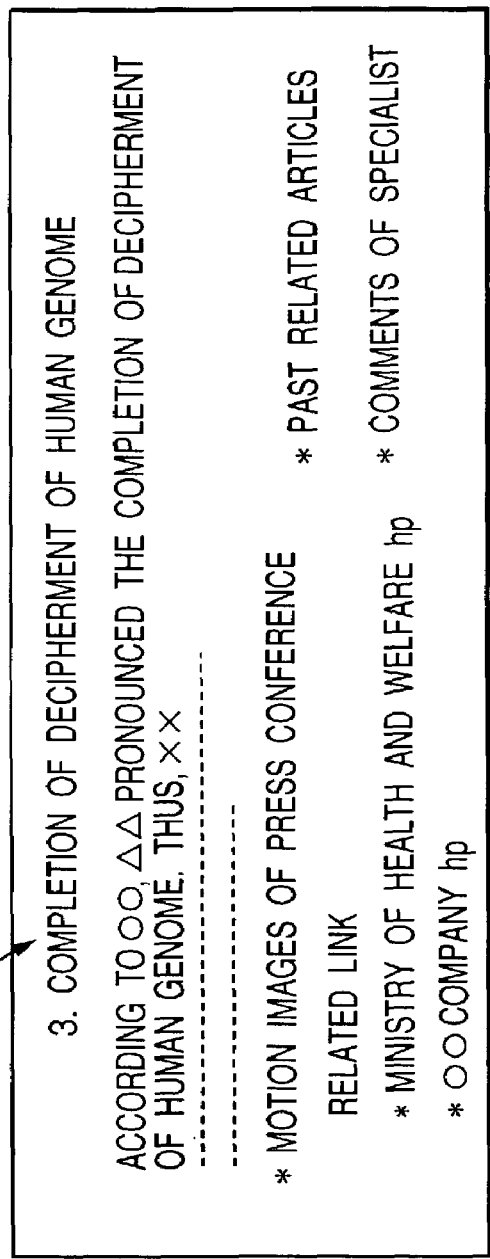
FIGS. 32A and 32B are schematic diagrams of picture plane which are displayed onto the client computer 112.

The operation in an example in which in the case where there is a relation with the articles distributed in the past, the related distribution data has been described in the article data will be further explained with reference to FIGS. 32A and 32B. The reception contractor accesses his own dedicated site from the self client computer 112 (FIG. 32A). Each item has been described as a menu in his own dedicated site. FIGS. 32A and 32B are schematic diagrams of picture plane which are displayed onto the client computer 112 in the first embodiment of the electronic newspaper system with the advertisement according to the invention.

The reception contractor accesses desired contents (information) by using the technique described in the operation for referring to the detailed articles by using the foregoing custom contents code. The accessing operation according to the technique for referring to the detailed articles by using the foregoing custom contents code as mentioned above will be explained again.

That is, the custom contents code "1" is allocated to "dissolution of the House of Representatives", the custom contents code "2" is allocated to "provision of favors by oo company", the custom contents code "3" is allocated to "completion of decipherment of human genome", and the custom contents code "4" is allocated to "record downpour in Tokyo", respectively.

Therefore, the reception contractor who wants to examine "completion of decipherment of human genome" more in detail enters the custom contents code "3".

Thus, the client computer 112 accesses the TPNC server 101 by the URL in which "3" has been allocated to the URL of the site shown in FIG. 32A.

When the URL in which the custom contents code "3" has been allocated is received, the TPNC server 101 authenticates the user (reception contractor).

If the user is determined to be the legal user as a result of the user authentication, the TPNC server 101 transmits detailed information of the information designated by the custom contents code to the client computer 112. The above explanation relates to the operation in the portion for referring to the detailed articles by using the foregoing custom contents code.

The present embodiment is characterized in that the related articles have been inserted in the transmitted information.

That is, for example, as shown in FIG. 32B, a link regarding not only the article of "completion of decipherment of human genome" but also related articles such as "motion images of press conference", "past related articles", "Ministry of Health and Welfare hp (homepage)", "comments of specialist", and "oo company hp" is constructed in the information received by the client computer 112. Therefore, the user can easily access the related articles.

Therefore, in the embodiment, not only the desired information can be properly obtained but also the information concerned with information can be obtained one after another.

In the embodiment described above, as for the advertisement option, a part of the subscription of the reception contractor 111 is merely paid by the advertisements.

However, not only the burden by the advertisements is paid as a part of the subscription in accordance with output layout conditions of the reception contractor 111 to the output printer 113, for example, a paper size, the maximum number of output paper, a color ratio, and the like but also the burden by the advertisements can be expanded to additional services such as presentation of a predetermined amount of consumables such as toner, ink, paper, or the like, discount sales of the consumables, provision of money or valuable securities, and the like regarding the printer 113 of the reception contractor 111.

Further, the reception intensity regarding the advertisement information shown in FIGS. 12A and 12B can be also changed or the like in accordance with a reaction of the reception contractor 111 to the advertisement, for example, an access history of the advertisement to the link destination URL. For example, it is presumed to change the system in a manner such that if there is an access history of a predetermined number of times or more, the distribution intensity is automatically increased.

That is, the TPNC server 101 records an access log as information regarding the access from the reception contractor 111 to TPNC server 101 and, if the information recorded in the access log is predetermined information, the conditions set in the advertisement information are changed.

For example, if the reception intensity is not high because the number of times of access to the link destination URL exceeds 20 times, the reception intensity is changed to "high".

However, the condition which is changed in accordance with the access history is not limited to the reception intensity but the distribution intensity or other conditions can be also arbitrarily changed as necessary.

According to the embodiment, therefore, services which are more adapted to the needs of the user can be provided.

Second Embodiment

The second embodiment of a contents distributing system according to the invention will now be described. The invention is not limited to the foregoing first embodiment. The embodiment will be also explained with respect to an electronic newspaper system with an advertisement as an example.

A construction of the embodiment, a structure of the TPNC server 101, client computer 112, news servers, and advertisement servers, and the like are similar to those in the first embodiment.

The operations of the embodiment other than the operations of portions, which will be explained hereinlater, are similar to those of the first electronic newspaper system with the advertisement. Therefore, points different from those in the first embodiment will be described hereinbelow.

In the foregoing first embodiment, notifying timing of the exchange timing of the toner cartridge is executed based on calculation of the consumption amount of the toner which is used for printing of the distribution data file.

However, if the residual toner amount information is transmitted from the printer 113, the invention is not limited to the case where the printer 113 particularly print-outputs only the distribution data file, but even if the printer 113 is used for another print output, the exchange timing of the toner cartridge can be managed.

Figure 33:
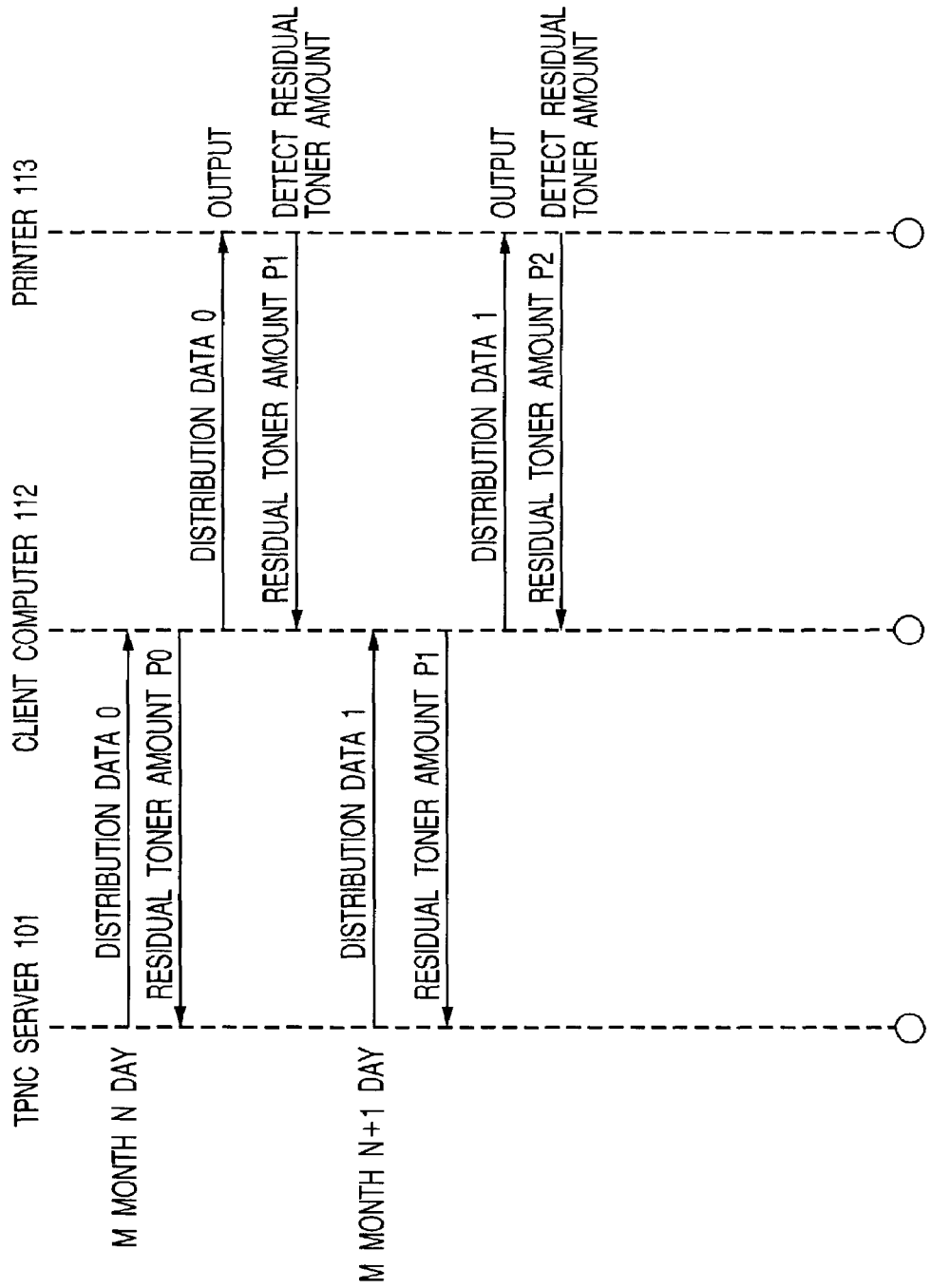
FIG. 33 is a flowchart showing transmission and reception of data among three apparatuses comprising the TPNC server 101, client computer 112, and printer 113 in an electronic newspaper system with an advertisement according to the second embodiment.

The operation which is executed when the TPNC server 101 is notified of the residual toner amount from the printer 113 in case of urging the exchange of the toner cartridge will now be described with reference to FIG. 33. FIG. 33 is a flowchart showing transmission and reception of data among three apparatuses comprising the TPNC server 101, client computer 112, and printer 113.

As shown in FIG. 33, when the client computer 112 receives the distribution data (distribution data file of E-mail) from the TPNC server 101, a residual toner amount P is transmitted from the client computer 112 to the TPNC server 101.

When the distribution data is transmitted from the client computer 112 to the printer 113 and the print output is executed, the residual toner amount P which is obtained after the execution of the print output is transmitted from the printer 113 to the client computer 112.

That is, a residual toner amount P1 shown in FIG. 33 will be described as an example. After the print output of distribution data 0 was executed by the printer 113 on M month N day, the printer 113 detects the residual toner amount P1. The residual toner amount P1 of the printer 113 can be detected by, for example, a toner sensor as disclosed in JP-A-08-339274.

After the print output was executed, the detected residual toner amount P1 is transmitted to the client computer 112 and the client computer 112 stores the residual toner amount P1.

Subsequently, when distribution data 1 is transmitted from the TPNC server 101 to the client computer 112 on M month N+1 day, information of the residual toner amount P1 stored in the client computer 112 is first transmitted to the TPNC server 101.

As mentioned above, the residual toner amount P is detected by the printer 113 after the execution of the print output of the distribution data. The TPNC server 101 receives the data of the residual toner amount P from the client computer 112 when the next distribution data is distributed.

Figure 34:
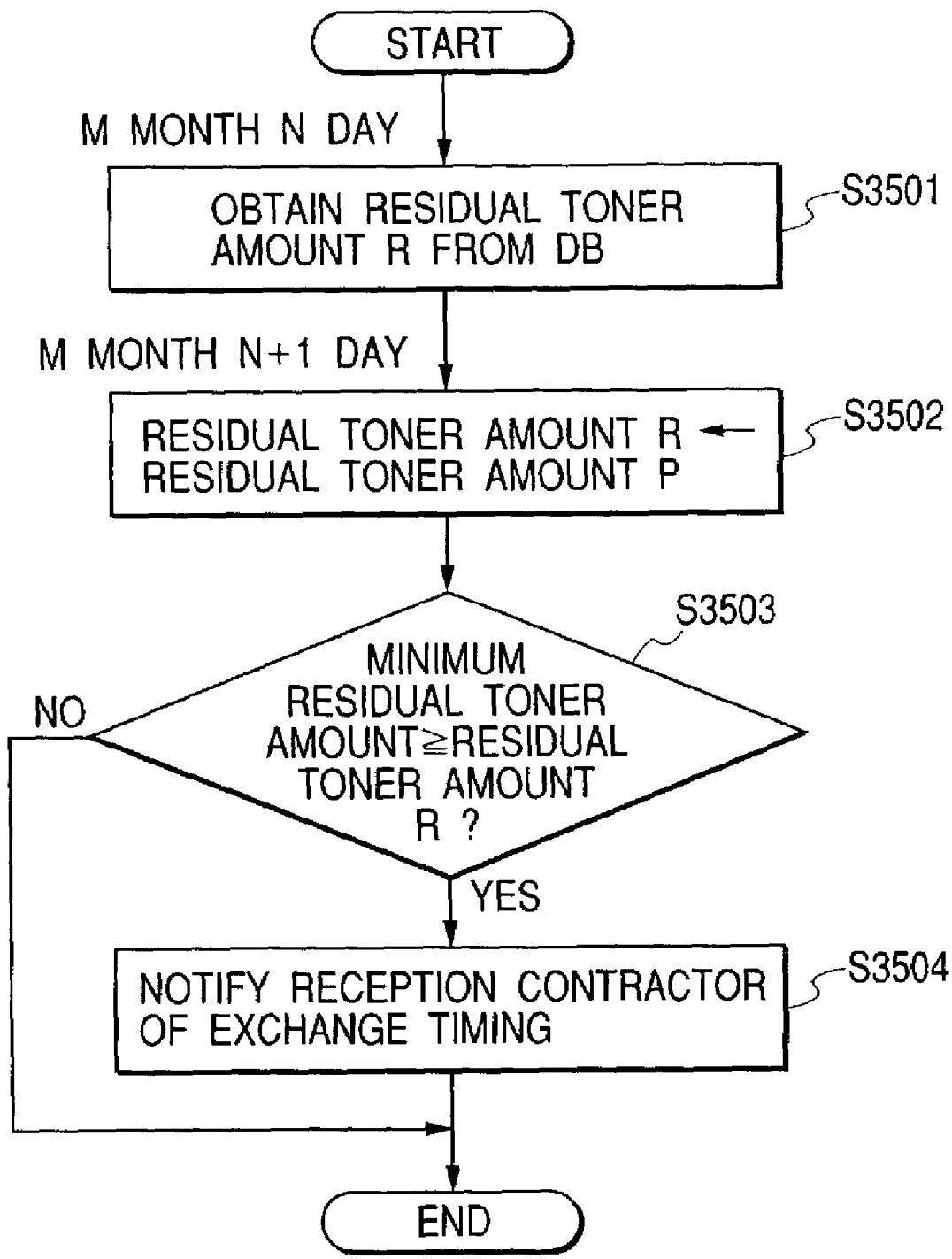
FIG. 34 is a flowchart for the operation which is executed in the case where the TPNC server 101 shown in FIG. 1 notifies timing for exchanging a toner cartridge after it received a residual toner amount P transmitted in accordance with the flowchart of FIG. 34.

Subsequently, the operation in the case where the TPNC server 101 shown in FIG. 1 notifies the timing for exchanging the toner cartridge after the reception of the residual toner amount P in the case where the exchange of the toner cartridge is urged will be described with reference to FIG. 34. FIG. 34 is a flowchart for the operation in the case where the TPNC server 101 shown in FIG. 1 notifies the timing for exchanging the toner cartridge after the reception of the residual toner amount P transmitted in accordance with the flowchart of FIG. 33.

In step S3501, the TPNC server 101 obtains a previous residual toner amount R of the toner cartridge. The previous residual toner amount R has been registered in toner cartridge information which is stored by the TPNC server 101.

In step S3502, after the reception of the residual toner amount P transmitted in accordance with the flowchart of FIG. 33, the TPNC server 101 updates the residual toner amount R to a value of the received residual toner amount P.

In step S3503, the TPNC server 101 discriminates whether the residual toner amount R is equal to or less than the minimum residual toner amount of the toner cartridge or not. The minimum residual toner amount which is set as a cartridge use limit of the toner cartridge has been registered in the toner cartridge information which is stored by the TPNC server 101.

In step S3503, if the residual toner amount R is larger than the minimum residual toner amount, the processing routine is finished as it is.

In step S3503, if the residual toner amount R is equal to or less than the minimum residual toner amount, step S3504 follows. The TPNC server 101 notifies the reception contractor 111 of the exchange timing of the toner cartridge. The exchange timing of the toner cartridge can be notified in a manner similar to the first embodiment.

Therefore, in the second embodiment, since the TPNC server 101 obtains the residual toner amount from the printer 113, an effect similar to that in the first embodiment of the electronic newspaper system with the advertisement according to the invention can be obtained. Since precision of the residual toner amount which is detected is high, the exchange timing can be accurately discriminated. The invention is not limited to the case where, particularly, only the distribution data file is print-outputted by the printer 113, but even if the printer 113 is used for another output, the exchange timing of the toner cartridge can be managed.

As described above, according to the invention, online article transmission which enables the detailed setting for different needs of each customer can be provided.

Further information such as related articles or the like regarding the original article can be easily provided from the custom contents code by a code which is unique to the reception contractor.

The user accesses the link to the advertisement, thereby enabling a service such as a discount of the subscription or the like to be easily provided.

Since the extracting conditions of the information and the advertisement information are changed on the basis of the access log, the information which is more adapted to the taste of the user and the desire of the advertiser can be transmitted.

In case of printing, the print costs for the consumables (toner, ink, etc.) in association with the printing of the advertisement are not paid by the reader but can be returned from the advertiser.

The management of the exchange timing of the cartridge (toner cartridge, ink cartridge, etc.) as consumables of the printer which is used to print can be confirmed upon reception of the exchange timing.

What is claimed is:

1. A contents distributing server for distributing, via a network, news contents which represent a news article and which are extracted from a news contents database to which attributes have been added, to an information processing apparatus which is used by a user, wherein distribution intensity information showing a distribution intensity of three levels or more is related to the news contents, wherein the distribution intensity information denotes a distribution index (y) which indicates a target number of persons for distributing the news contents, and wherein a value of the distribution index is a small value for a large target number of persons and increases correspondingly to a high value for a small target number of persons, said server comprising:
   a managing unit that receives, from the information processing apparatus, reception intensity information showing a reception intensity of three levels or more which were set via a user interface for setting the reception intensity to receive the news contents displayed in a display unit of said information processing apparatus, and that manages the received reception intensity information, wherein the reception intensity information denotes a reception index (x) which indicates a degree of interest by a user of the news contents, and wherein a value of the reception index is a small value for a low level of degree of interest by the user and increases correspondingly to a high value for a high level of degree of interest by the user;
   a comparing unit that makes a comparison between the distribution intensity information of the three levels or more related to the news contents and the reception intensity information of the three levels or more managed by said managing unit so as to determine whether the news contents are to be distributed, wherein the comparison compares the value of x and the value of y to determine whether or not to distribute the new contents, and the news contents are determined to be distributed if $(x \geq y)$;
   an extracting unit that extracts at least one of the news contents in accordance with a result made by the comparison of said comparing unit; and
   a distribution control unit that controls the distribution of the at least one news content extracted by said extracting unit.

2. A server according to claim 1, wherein said distribution control unit transmits the news contents corresponding to an intensity higher than the reception intensity which was notified by said information processing apparatus to a notification destination which has previously been registered.

3. A server according to claim 1, wherein a setting function for setting said reception intensity for each of at least two kinds of news contents is included in said user interface, and said managing unit manages the reception intensity set for each of the at least two kinds of said news contents.

4. A server according to claim 1, further comprising a discriminating unit that discriminates whether or not a collecting base point is included in a desired distributing range and/or whether or not a distribution base point is included in a desired collecting range in accordance with information of the distribution base point corresponding to the news contents and the desired distributing range and information of the collecting base point and the desired collecting range of the news contents which were set via said user interface,
   and wherein said distribution control unit distributes said news contents in accordance with a result of the discrimination of said discriminating unit.

5. A server according to claim 4, wherein application information is allowed to be concerned with said collecting base point, application information is further included in the attributes of said news contents, and said distribution control unit distributes said news contents in accordance with adaptation of the application information included in the attributes of said news contents and the application information concerned with said collecting base point.

6. A server according to claim 1, wherein information of a color priority is included in said news contents,
   said managing unit receives and manages information of desired color degrees of at least two or more levels set through the user interface for setting the information of the desired color degree in the reception of the news contents displayed in the display unit of said information processing apparatus, and
   said distribution control unit controls the distribution of said news contents in accordance with a result of the comparison of the information of the desired color degree included in the attributes of the news contents stored in said news contents database and the information of the desired color degrees of said two or more levels.

7. A server according to claim 1, wherein original news contents codes for specifying the news contents are included in the attributes of said news contents, and
   wherein said server further comprises:
   a correspondence unit that allows a custom news contents code to correspond to each of the original news contents codes of the news contents distributed to a predetermined user by said distribution control unit; and
   a specifying unit that specifies the original news contents code in accordance with information which is input from an external apparatus and used for specifying the user and the custom news contents codes;

wherein said distribution control unit controls the distribution of the news contents corresponding to the original news contents code specified by said specifying unit.

8. A server according to claim 1, wherein first news contents and second news contents indicative of advertisement news contents are included in said news contents, and wherein said server further comprises:

a presuming unit that presumes an amount of consumables which were consumed for output of said advertisement news contents; and a calculating unit that calculates an amount of money according to the amount of consumables which was presumed by said presuming unit.

9. A server according to claim 8, wherein in said presuming the amount of consumables which were consumed for output of said second news contents, an image ratio is used as a parameter.

10. A contents distribution control method by a news contents distributing server for distributing, via a network, news contents which represent a news article and which are extracted from a news contents database to which attributes have been added, to an information processing apparatus which is used by a user, wherein distribution intensity information showing a distribution intensity of three levels or more is related to the news contents, wherein the distribution intensity information denotes a distribution index (y) which indicates a target number of persons for distributing the news contents, and wherein a value of the distribution index is a small value for a large target number of persons and increases correspondingly to a high value for a small target number of persons, said method comprising:

a managing step of receiving, from the information processing apparatus, reception intensity information showing a reception intensity of three levels or more which were set via a user interface for setting the reception intensity to receive the news contents displayed in a display unit of the information processing apparatus, and managing the received reception intensity information, wherein the reception intensity information denotes a reception index (x) which indicates a degree of interest by a user of the news contents, and wherein a value of the reception index is a small value for a low level of degree of interest by the user and increases correspondingly to a high value for a high level of degree of interest by the user;

a comparing step of making a comparison between the distribution intensity information of the three levels or more related to the news contents and the reception intensity information of the three levels or more managed by said managing step so as to determine whether the news contents are to be distributed, wherein the comparison compares the value of x and the value of y to determine whether or not to distribute the new contents, and the news contents are determined to be distributed if (x≧y);

an extracting step of extracting at least one of the news contents in accordance with a result of the comparison made in the comparing step; and a distribution control step of controlling the distribution of the at least one news content extracted by said extracting step.

11. A method according to claim 10, wherein in said distribution control step, the news contents corresponding to an intensity higher than the reception intensity which was notified by said information processing apparatus are transmitted to a notification destination which has previously been registered.

12. A method according to claim 11, wherein a setting function for setting said reception intensity for each of at least two kinds of news contents is included in said user interface, and in said managing step, the reception intensity set for each of the at least two kinds of said news contents is managed.

13. A method according to claim 10, further comprising a discriminating step of discriminating whether or not a collecting base point is included in a desired distributing range and/or whether or not a distribution base point is included in a desired collecting range in accordance with information of the distribution base point corresponding to the news contents and the desired distributing range and information of the collecting base point and the desired collecting range of the news contents which were set via said user interface, and wherein in said distribution control step, said news contents are distributed in accordance with a result of the discrimination in said discriminating step.

14. A method according to claim 13, wherein application information is allowed to be concerned with said collecting base point, application information is further included in the attributes of said news contents, and in said distribution control step, said news contents are distributed in accordance with adaptation of the application information included in the attributes of said news contents and the application information concerned with said collecting base point.

15. A method according to claim 10, wherein information of a color priority is included in said news contents, in said managing step, information of desired color degrees of at least two or more levels set through the user interface for setting the information of the desired color degree in the reception of the news contents displayed in the display unit of said information processing apparatus is received and managed, and in said distribution control step, the distribution of said news contents is controlled in accordance with a result of the comparison of the information of the desired color degree included in the attributes of the news contents stored in said news contents database and the information of the desired color degrees of said two or more levels.

16. A method according to claim 10, wherein original news contents codes for specifying the news contents are included in the attributes of said news contents, and wherein said method further comprises a correspondence step of allowing a custom news contents code to correspond to each of the original news contents codes of the news contents distributed to a predetermined user in said distribution control step; and a specifying step of specifying the original news contents code in accordance with information which is inputted from an external apparatus and used for specifying the user and the custom news contents codes, wherein in said distribution control step, the distribution of the news contents corresponding to the original news contents code specified in said specifying step is controlled.

17. A method according to claim 10, wherein first news contents and second news contents indicative of advertisement news contents are included in said news contents, wherein said method further comprises:

a presuming step of presuming an amount of consumables which were consumed for output of said advertisement news contents; and a calculating step of calculating an amount of money according to the amount of consumables which was presumed in said presuming step.

18. A method according to claim 17, wherein in said step of presuming the amount of consumables which were consumed for output of said second news contents, an image ratio is used as a parameter.

19. A computer-readable storage medium on which is stored a computer-readable program that is read out and executed by a news contents distributing server for distributing, via a network, news contents which represent a news article and which are extracted from a news contents database to which attributes have been added, to an information processing apparatus which is used by a user, wherein distribution intensity information showing a distribution intensity of three levels or more is related to the news contents, wherein the distribution intensity information denotes a distribution index (y) which indicates a target number of persons for distributing the news contents, and wherein a value of the distribution index is a small value for a large target number of persons and increases correspondingly to a high value for a small target number of persons, said program comprising:

a managing step of receiving, from the information processing apparatus, reception intensity information showing a reception intensity of three levels or more which were set via a user interface for setting the reception intensity to receive the news contents displayed in a display unit of the information processing apparatus, and managing the received reception intensity information, wherein the comparison compares the value of x and the value of y to determine whether or not to distribute the new contents, and the news contents are determined to be distributed if $(x \geq y)$;

a comparing step of making a comparison between the distribution intensity information of the three levels or more related to the news contents and the reception intensity information of the three levels or more managed by said managing step so as to determine whether the news contents are to be distributed, wherein the comparison compares the value of x and the value of y to determine whether or not to distribute the new contents, and the news contents are determined to be distributed if $(x \geq y)$;

an extracting step of extracting at least one of the news contents in accordance with a result of the comparison in the comparing step; and a distribution control step of controlling the distribution of the at least one news content extracted by said extracting step.

* * * * *

UNITED STATES PATENT AND TRADEMARK OFFICE
CERTIFICATE OF CORRECTION

PATENT NO. : 7,386,603 B2
APPLICATION NO. : 10/177210
DATED : June 10, 2008
INVENTOR(S) : Rikio Shiba et al.

It is certified that error appears in the above-identified patent and that said Letters Patent is hereby corrected as shown below:

COLUMN 9:
        Line 9, Delete "not".

COLUMN 18:
        Line 9, "discriminates" should read -- it is discriminated --.

COLUMN 20:
        Line 6, "interesting," should read -- interest, --;
        Line 15, "interesting," should read -- interest, --;
        Line 23, "interesting" should read -- interest --;
        Line 25, "interesting" should read -- interest --; and
        Line 26, "interesting" should read -- interest --.

COLUMN 22:
        Line 33, "value a" should read -- value $\alpha$ --; and
        Line 34, Delete "a".

COLUMN 24:
        Line 28, "in" should read -- in the --.

COLUMN 26:
        Line 36, "(N the" should read -- (N=the --.

COLUMN 29:
        Line 29, "determined" should read -- determined for --.

COLUMN 34:
        Line 1, "new" should read -- news --.

UNITED STATES PATENT AND TRADEMARK OFFICE
CERTIFICATE OF CORRECTION

PATENT NO. : 7,386,603 B2
APPLICATION NO. : 10/177210
DATED : June 10, 2008
INVENTOR(S) : Rikio Shiba et al.

It is certified that error appears in the above-identified patent and that said Letters Patent is hereby corrected as shown below:

COLUMN 35:
 Line 2, "codes;" should read -- codes, --; and
 Line 56, "new" should read -- news --.

COLUMN 38:
 Line 8, "new" should read -- news --; and
 Line 18, "new" should read -- news --.

Signed and Sealed this

Third Day of March, 2009

JOHN DOLL
*Acting Director of the United States Patent and Trademark Office*